(12) United States Patent
Mullins et al.

(10) Patent No.: US 11,847,683 B2
(45) Date of Patent: Dec. 19, 2023

(54) HOSTING SYSTEMS CONFIGURED TO GENERATE OPTIMIZED CONTENT BASED ON DYNAMIC TOKENS AND METHODS OF USE THEREOF

(71) Applicant: Go Daddy Operating Company, LLC, Scottsdale, AZ (US)

(72) Inventors: Angeley Mullins, Seattle, WA (US); Ana Alicia Grace, Sammamish, WA (US); Stacy SteinKuller, Phoenix, AZ (US); Joshua Ray Rossman, Scottsdale, AZ (US); Garrett Matsudaira, Bellevue, WA (US); Stephen Russell Baird, Gilbert, AZ (US); Anirban Kundu, San Francisco, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 121 days.

(21) Appl. No.: 17/181,905

(22) Filed: Feb. 22, 2021

(65) Prior Publication Data

US 2021/0174423 A1 Jun. 10, 2021

Related U.S. Application Data

(63) Continuation of application No. 16/402,596, filed on May 3, 2019, now abandoned, which is a continuation
(Continued)

(51) Int. Cl.
*G06Q 30/06* (2023.01)
*G06Q 30/0601* (2023.01)
(Continued)

(52) U.S. Cl.
CPC ... *G06Q 30/0631* (2013.01); *G06F 16/24578* (2019.01); *G06Q 30/0601* (2013.01);
(Continued)

(58) Field of Classification Search
CPC .......... G06Q 30/0601; G06Q 30/0631; G06Q 30/0641; G06F 16/24578; G06F 16/958; H04L 61/302; H04L 61/451
(Continued)

(56) References Cited

U.S. PATENT DOCUMENTS

| 11,284,171 B1* | 3/2022 | Nair ................. H04N 21/25891 |
| 2002/0049961 A1* | 4/2002 | Fang ........................ G06F 8/34 |
| | | 717/127 |

(Continued)

FOREIGN PATENT DOCUMENTS

| CN | 104205158 A | * 12/2014 | ............... G06N 5/02 |
| WO | WO-2020226727 A1 | * 11/2020 | ....... G06F 16/24578 |

OTHER PUBLICATIONS

Nguyen et al.; "Ultra-large alignments using phylogeny-aware profiles" Genome Biology 16:124 (Jun. 16, 2015); retrieved from Dialog on Mar. 6, 2023 (Year: 2015).*

(Continued)

*Primary Examiner* — Yogesh C Garg
(74) *Attorney, Agent, or Firm* — GREENBERG TRAURIG, LLP

(57) ABSTRACT

In some embodiments, the present disclosure describes a method that includes at least: receiving, by a processor, audience data identifying candidate audience for a website content; generating a plurality of audience groups based on the audience data; receiving user identifying data of a user; generating personalized online content for the user; tagging the personalized online content with a plurality of dynamic tokens to form trackable personalized online content; trans-
(Continued)

Algorithm for Universal Purchase Path mitting instructions to display the trackable personalized online content on a screen of a computing device; receiving user activity tracking data; training a machine learning algorithm, based on the user activity tracking data, to obtain a trained machine learning content recommendation engine; and utilizing the trained machine learning content recommendation engine to identify updated trackable personalized online content based on a plurality of markups to the trackable personalized online content.

10 Claims, 33 Drawing Sheets

Related U.S. Application Data of application No. 15/197,571, filed on Jun. 29, 2016, now Pat. No. 10,319,023.

(51) Int. Cl.
*G06F 16/2457* (2019.01)
*H04L 61/4511* (2022.01)
*G06F 16/958* (2019.01)
*H04L 61/3015* (2022.01)

(52) U.S. Cl.
CPC ...... *G06Q 30/0641* (2013.01); *H04L 61/4511* (2022.05); *G06F 16/958* (2019.01); *H04L 61/302* (2013.01)

(58) Field of Classification Search
USPC .......................................................... 705/26.7
See application file for complete search history.

(56) References Cited

U.S. PATENT DOCUMENTS

| | | | |
|---|---|---|---|
| 2014/0052540 A1* | 2/2014 | Rajaram | G06Q 30/0271 705/14.66 |
| 2016/0071094 A1* | 3/2016 | Krishnaiah | G06Q 20/363 705/66 |
| 2016/0299977 A1* | 10/2016 | Hreha | G06F 16/9537 |
| 2017/0161817 A1* | 6/2017 | Othmer | G06Q 30/0639 |
| 2017/0186031 A1* | 6/2017 | Kirti | G06Q 30/0277 |
| 2018/0165580 A1* | 6/2018 | Boyer | G06F 16/00 |

OTHER PUBLICATIONS

Audiffren, et al; "A Non Linear Scoring Approach for Evaluating Balance: Classification of Elderly as Fallers and Non-Fallers"; PloS ONE 11.12: e0167456. Public Library of Science. (Dec. 9, 2016), retrieved from Dialog on Mar. 7, 2023 (Year: 2016).*

* cited by examiner

Purchase Path Flows for Domain Name Purchases Optimized for Conversion

Purchase Path Flows for Hosting Purchases

Shared Hosting Flow - All Phases

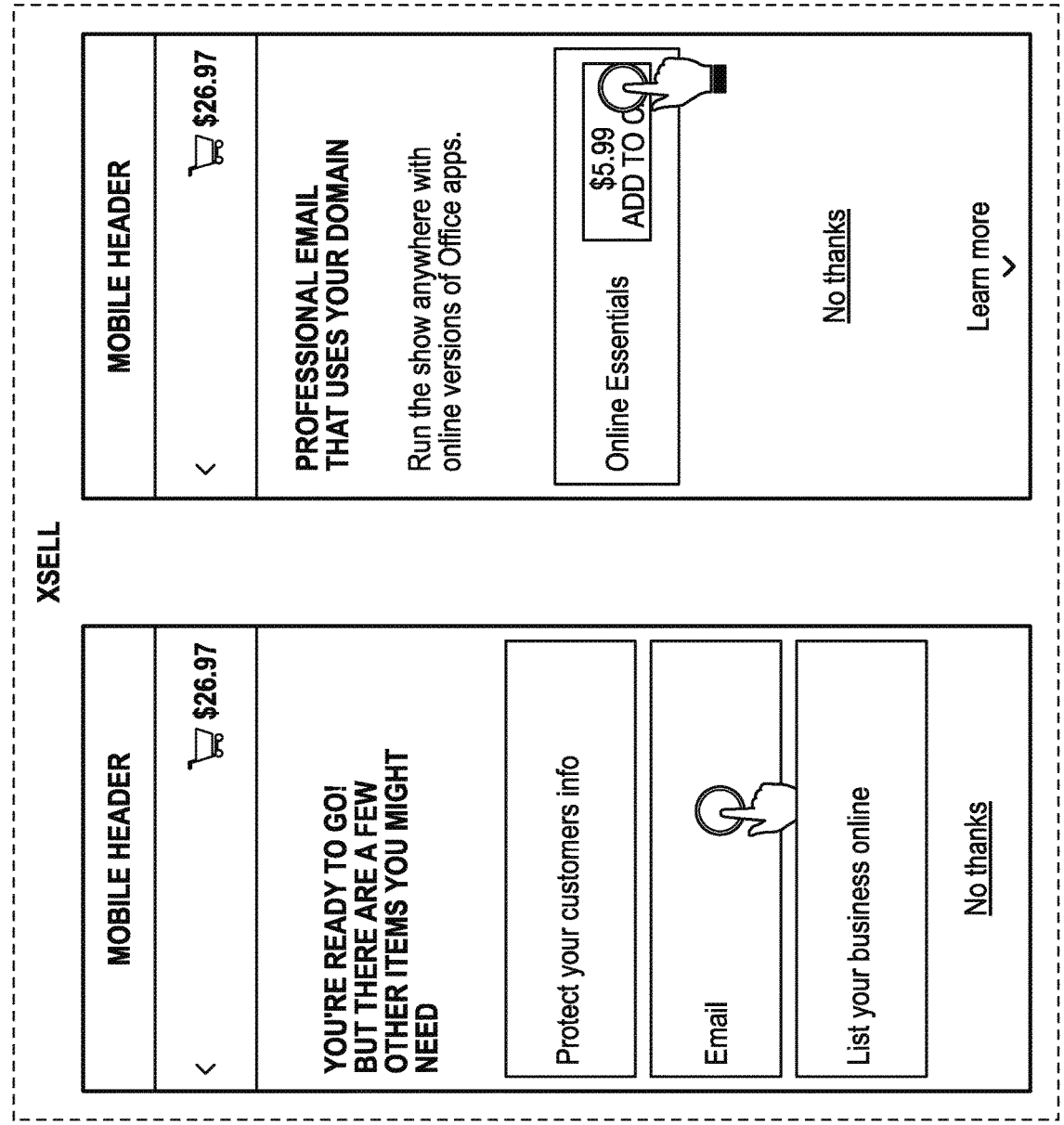

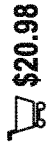
FIG. 30
FIG. 31

Part of Scoring Algorithm Product Recommendation

Part of Scoring Algorithm Product Recommendation

Part of Scoring Algorithm Product Recommendation

Example of Model Data

```
{u'dt_a_evening': 1,
 u'dt_a_sta': 1,
 u'dt_a_weekend': 1,
 u'dt_r_day': 5,
 u'dt_r_hour': 7,
 u'geo_north_america': 1,
 u'geo_united_states': 1,
 u'pnl_domain_name_registration': 1,
 u'prodtypeid_2': 1,
 u'pv_domains_domain_configuration_aspx': 1,
 u'pv_domains_domain_registration_aspx': 1,
 u'pv_domains_searchresults_aspx': 1,
 u'ua_br_chrome': 1,
 u'ua_os_windows': 1,
 u'ua_os_windows_7': 1,
 u'ua_pc': 1,
 u'word_ladi': 3,
 u'word_pink': 3,
 u'word_slim': 2,
 u'word_tld_com': 3,
 u'word_www': 3}
```

Real-time Session Data
* dt - daytime
* geo - location
* pnl - product in cart
* ua - user agent
* word - search log tokens

FIG. 40

HOSTING SYSTEMS CONFIGURED TO GENERATE OPTIMIZED CONTENT BASED ON DYNAMIC TOKENS AND METHODS OF USE THEREOF

CROSS-REFERENCE TO RELATED APPLICATIONS

This application is a continuation of U.S. patent application Ser. No. 16/402,596, filed May 3, 2019, which is a continuation of U.S. patent application Ser. No. 15/197,571 entitled "UNIVERSAL PURCHASE PATH THAT MAY BE OPTIMIZED FOR CONVERSION OR REVENUE" and filed on Jun. 29, 2016.

FIELD OF THE INVENTION

A method of customizing a universal purchase path for each customer purchasing a product on a website of a domain name registrar. The universal purchase path may include a plurality of final page markups created from modular cross sell components and relevant content.

SUMMARY OF THE INVENTION

A domain name registrar may create and store a first plurality of modular cross sell components. Each modular cross sell component may have material for at least one product offered for sale by the domain name registrar.

A website of a domain name reseller or the domain name registrar may receive over a computer network a request to enter a product into an electronic shopping cart by a customer using a client device.

The domain name registrar may create a second plurality of modular cross sell components (that is a subset of the first plurality of modular cross sell components). If the customer selected the product on the website of the domain name reseller, the second plurality of modular cross sell components may be created by filtering out one or more modular cross sell components that has material for the product not sold by the domain name reseller.

Alternatively, or in combination, the domain name registrar may create the second plurality of modular cross sell components (that is a subset of the first plurality of modular cross sell components) by filtering out one or more modular cross sell components that has material for the product that cannot be sold in a market associated with an IP address used by the client device.

Alternatively, or in combination, the domain name registrar may create the second plurality of modular cross sell components (that is a subset of the first plurality of modular cross sell components) by filtering out one or more modular cross sell components that have material for the product not offered for sale with a TLD of any domain name being purchased in the electronic shopping cart.

The domain name registrar may apply a scoring algorithm to rank the second plurality of modular cross sell components from most to least likely to be purchased by the customer. The domain name registrar may select a third plurality of modular cross sell components from the second plurality of modular cross sell components with material for products that are the most likely to be purchased by the customer based on the scoring algorithm.

The domain name registrar may collect content for the third plurality of modular cross sell components. The domain name registrar may build a plurality of final page markups by combining the collected content with the third plurality of modular cross sell components. The domain name registrar may transmit over the computer network the plurality of final page markups to the client device of the customer. The client device may be configured to display each transmitted final page markup in the plurality of final page markups one at a time to the customer.

In another embodiment, a domain name registrar may create and store a first plurality of modular cross sell components. Each modular cross sell component may have material for at least one product offered for sale by the domain name registrar.

A website of the domain name registrar may receive over a computer network a request to enter a product into an electronic shopping cart by a customer using a client device. The domain name registrar may determine a probability that the customer will complete a purchase of the product in the electronic shopping cart if shown one or more final page markups for an upgrade and/or an additional product before the customer completes the purchase.

Upon determining by the domain name registrar that the probability that the customer will complete the purchase of the product if shown the final page markup for the upgrade or additional products is under a predetermined threshold, the domain name registrar preferably does NOT display final page markups for upgraded and/or additional products before completing the purchase (collecting the fees) of the product with the customer. After completing the purchase, the domain name registrar has the option to display or not to display final page markups for upgrades or additional products to the customer.

On the other hand, upon determining by the domain name registrar that the probability that the customer will complete the purchase of the product if shown the final page markup for the upgrade or the additional product is over a predetermined threshold, the domain name registrar may display final page markups for upgraded and/or additional products before completing the purchase (collecting the fees) of the product with the customer. The domain name registrar may apply a scoring algorithm to rank the first plurality of modular cross sell components from most to least likely to be purchased by the customer. The domain name registrar may select a second plurality of modular cross sell components with material for products that are the most likely to be purchased by the customer based on the scoring algorithm. The domain name registrar may collect content for the second plurality of modular cross sell components. The domain name registrar may build a plurality of final page markups by combining the collected content with the second plurality of modular cross sell components. The domain name registrar may transmit, before collecting a payment for the product from the customer, over the computer network the plurality of final page markups to the client device of the customer. The client device may be configured to display each transmitted final page markup in the plurality of final page markups one at a time to the customer. The domain name registrar may collect the payment, after transmitting the plurality of final page markups, for the product from the customer.

The above features and advantages of the present invention will be better understood from the following detailed description taken in conjunction with the accompanying drawings.

BRIEF DESCRIPTION OF THE DRAWINGS

FIGS. 25-26 illustrate a possible first and second final page markups that may be displayed one at a time and in sequence to the customer to allow the customer to purchase additional products, possible products related to the purchase of a domain name or hosting.

FIGS. 27-29 illustrate a possible first, second and third final page markups that may be displayed to the customer to allow the customer to select additional products related to the purchase of a domain name by the customer. The second final page markup chosen to be displayed to the customer is dependent on the actions of the customer with the first final page markup and the third final page markup chosen to be displayed to the customer is dependent on the actions of the customer with the second final page markup.

FIGS. 30-31 illustrate a first and a second final page markup that may be used to receive a selection of a tier for a product and receive a confirmation of placing the additional product into the shopping cart.

FIGS. 39-40 illustrate example model data that may be used by the scoring algorithm in making product recommendations.

DETAILED DESCRIPTION

Figure 1:
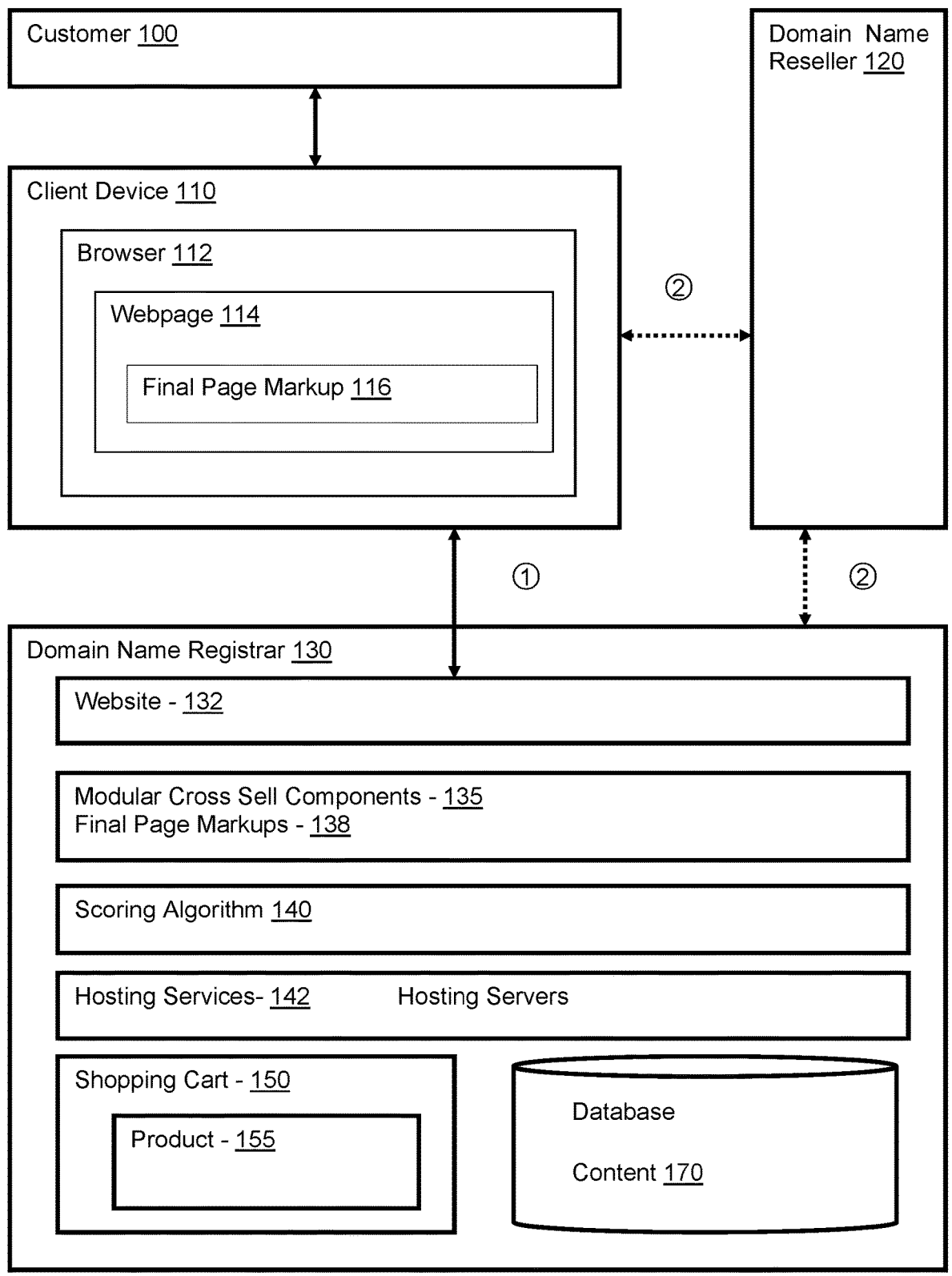
FIG. 1 is a block diagram of a system that allows a universal purchase path within a domain name registrar to be customized for customers where the universal purchase path includes a plurality of final page markups created from a plurality of modular cross sell components combined with relevant content.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that allows a universal purchase path within a domain name registrar 130 to be customized for customers. The universal purchase path may include a plurality of final page markups 138 created from a plurality of modular cross sell components 135 combined with relevant content 170.

The arrows between the client device 110, domain name registrar 130 and domain name reseller 120 represent one or more computer networks. Communications and transmissions over the computer networks may use any currently known or developed in the future methods or protocols.

A computer network is a collection of links and nodes (e.g., multiple computers and/or other devices connected together) arranged so that information may be passed from one part of the computer network to another part of the computer network over multiple links and through various nodes. Non-limiting examples of computer networks include the Internet, a public switched telephone network, a global Telex network, an intranet, an extranet, a local-area network, a wide-area network, wired networks, wireless networks and/or cell phone networks.

The Internet is a worldwide network of hardware servers and computer networks arranged to allow for the easy and robust exchange of information between, for example, a customer 100 (who may be a domain name registrant) using a client device 110 and one or more websites hosted on one or more hosting servers.

Hardware servers and hosting servers are hereby defined to be physical machines. While hardware servers and hosting servers provide the hardware to run software, the hardware servers and hosting servers are hereby defined to not be merely or only software. Hardware servers and hosting servers may be, as non-limiting examples, one or more Dell PowerEdge(s) rack server(s), HP Blade Servers, IBM Rack or Tower servers, although other types of hardware servers and/or combinations of other hardware servers may also be used.

Hundreds of millions of customers may use the Internet around the world. The customers will have access to client devices 110 connected to the Internet. A customer 100 may use a client device 110, such as, as non-limiting examples, a cell phone, PDA, tablet, laptop computer or desktop computer to access a website via the Internet. Customers are able to access data at specific locations on the Internet referred to as websites. Each website may be a single webpage 114, but typically websites consist of multiple interconnected and related webpages. Websites may, as a non-limiting example, be created using HyperText Markup Language (HTML) to generate a standard set of tags that define how the webpages for the website are to be displayed on the client device 110.

Hosting providers may provide the hardware, such as hosting servers, and infrastructure necessary to host one or more websites, possibly for a plurality of customers that may be domain name registrants and/or website operators or owners. Menus, links, tabs, etc. may be used by the customers to move between different web pages within a website or to move to a different webpage on a different website. The combination of all the websites and their corresponding web pages on the Internet is generally known as the World Wide Web (WWW) or simply the Web.

Customers may access websites on their client device 110 using software known as an Internet browser 112, such as MICROSOFT INTERNET EXPLORER, GOOGLE CHROME or MOZILLA FIREFOX. After the browser 112 has located a desired webpage in a desired website, the browser 112 requests and receives information regarding the webpage, typically in the form of an HTML document, and then displays the webpage for the customer 100 on the client device 110 of the customer 100. The customer 100 may then view other webpages at the same website or move to an entirely different website using the client device 110 and the browser 112.

Browsers are able to locate specific websites because each website has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

However, IP addresses, even in human readable notation, are difficult for customers (Internet users in general) to remember and use. A domain name is easier to remember and may be associated with an IP Address that points to a website on the Internet. A browser 112 may be able to access the website on the Internet through the use of the domain name.

Domain names are also much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry to be an authoritative source of information (the particular data stored by the registry varies depending on the TLD). One or more domain name registrars may register domain names to customers, i.e., domain name registrants, on behalf of a registry.

The process for registering a domain name with .com, .net, .org, and some other TLDs allows a user to use an ICANN-accredited domain name registrar 130 to register a domain name. For example, if a user, John Doe, wishes to register the domain name "johndoe.com," John Doe may initially determine whether the desired domain name is available from a landing webpage 114 of a domain name registrar 130. The domain name customer 100 may make this contact using the registrar's website 132 and typing the desired domain name into a field on the webpage 114 of the website 132 of the registrar 130 created for this purpose.

Upon receiving a domain name or a domain name search request from the customer 100, the registrar 130 may ascertain whether "johndoe.com" has already been registered by, as non-limiting examples, checking the shared resource system (SRS) for the TLD of the domain name or by checking with the authoritative registry for the TLD. The results of the search may be displayed on the webpage 114 to notify the customer 100 of the availability of the desired domain name.

If the desired domain name is available, the customer 100 may register the domain name, thereby becoming the domain name registrant of the domain name. If the desired domain name is not available for registration, the registrar 130 may transmit one or more suggested domain names to the customer 100 to permit the customer 100 to select and register one or more of the suggested domain names. A customer 100 may register one or more domain names using this process.

Once a domain name is registered to the customer 100, the customer 100 may desire to have the domain name point to a website owned, controlled and operated by the customer 100. This allows the customer 100 (or any other Internet user) to enter the domain name into a browser 112 and then enables the browser 112 to access the information on the website pointed to by the domain name. The Domain Name System (DNS) may be used by browsers to convert domain names into IP addresses of websites.

In preferred embodiments, the domain name registrar 130 is able to offer other products related to domain names, such as, as non-limiting examples, website hosting services 142 (hosting), secure socket layer (SSL) certificates, email accounts, privacy settings, search engine optimization (SEO) services, etc. These additional products may require an eligibility check to make sure the customer 100 and/or domain name are eligible (technically and/or legally) to be used together. The additional products may have configuration settings that may be customized by the customer 100. The additional products may also have different tier levels that may be selected by the customer 100. The additional products may also have to be activated to begin operation.

While the customer 100, using the client device 110, may communicate directly with the domain name registrar 130, in some embodiments, the customer 100, again using the client device 110, may communicate purchase requests (and other information) with a domain name reseller 120. The domain name reseller 120 may then communicate on behalf of the customer 100 back and forth with the domain name registrar 130, using, as a non-limiting example, an application program interface (API).

In other embodiments, the domain name reseller 120 may simply transfer the customer 100, possibly via a link on the website of the domain name reseller 120, to the domain name registrar 130 to finalize the purchase of the product(s), perform eligibility checks for the product(s), configure the settings for the product(s) as needed, allow the customer 100 to select desired tiers if available and activate the product(s) if needed.

Figure 2:
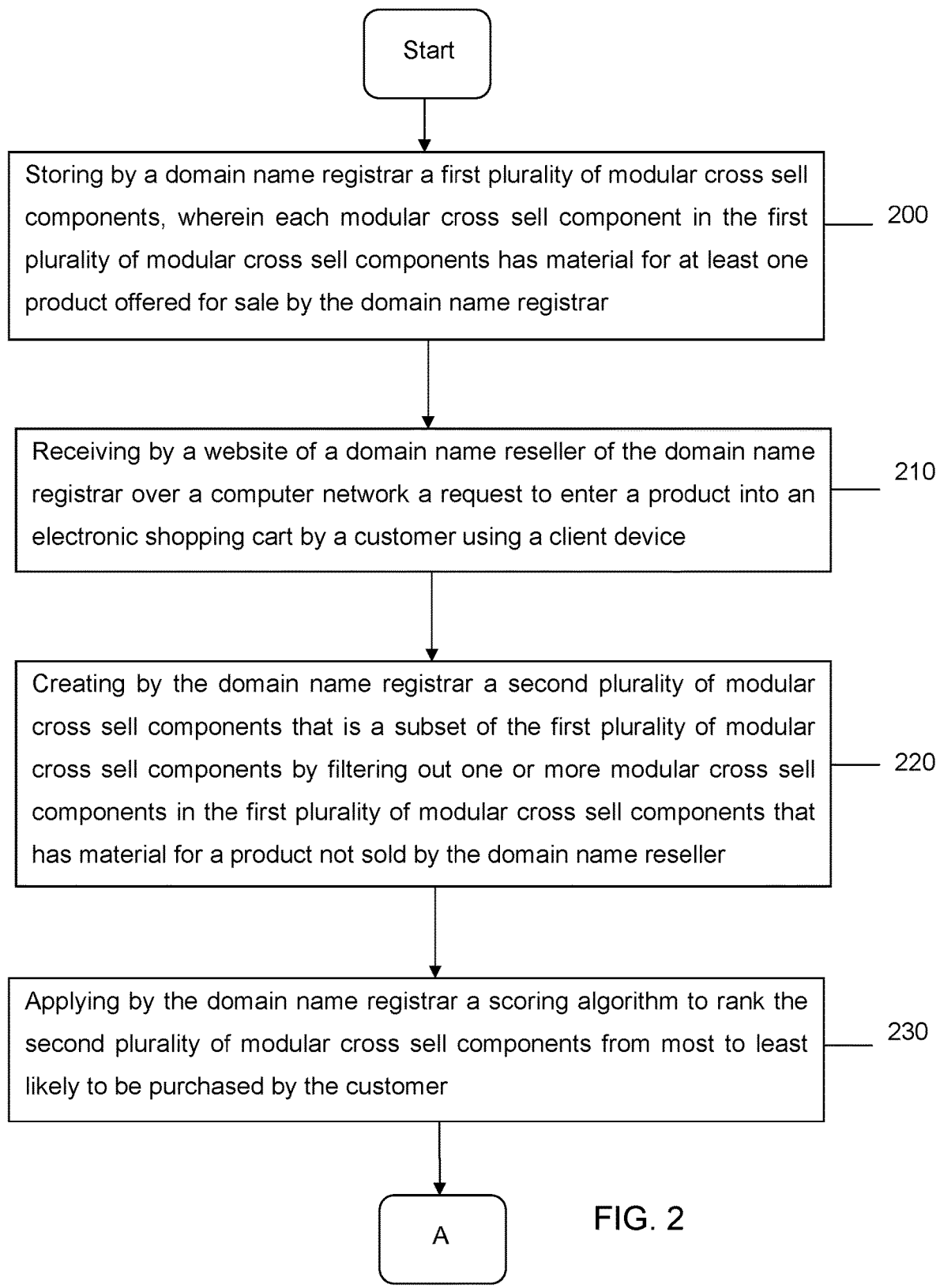
FIGS. 2-3 are a flow-chart illustrating an embodiment of the invention where a customer selects a product on a website of a domain name reseller for a domain name registrar and a universal customized purchase path at the domain name registrar does not include final page markups (created from modular cross sell components and relevant content) for products not offered for sale by the domain name reseller.
Figure 3:
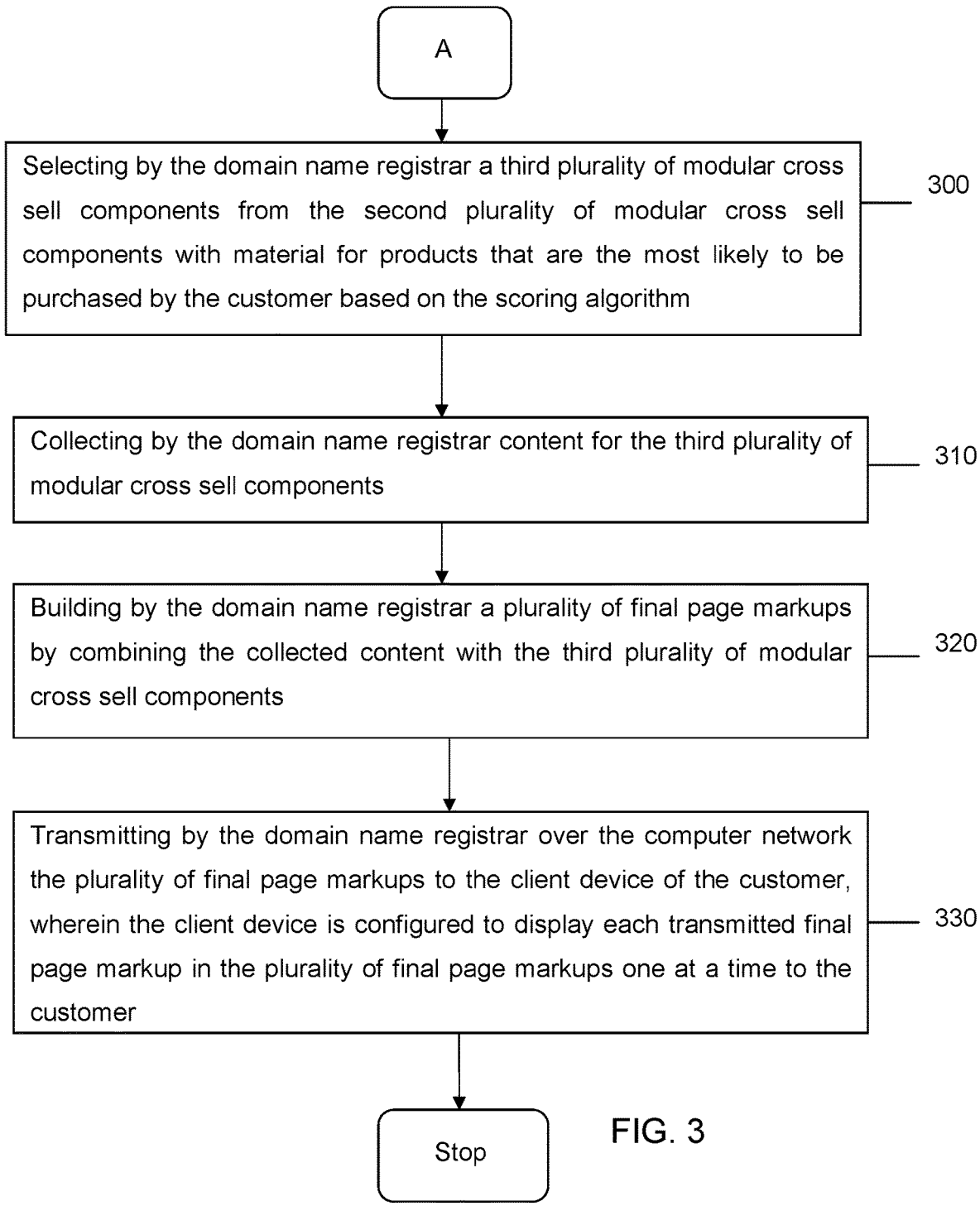

With reference to FIGS. 2-3, a method is disclosed for a customer 100 to select a product 155 on a website of a domain name reseller 120. The domain name reseller 120 may sell one or more products for a domain name registrar 130. The method includes creating a universal purchase path that may be customized for the customer 100 at the domain name registrar 130. In preferred embodiments, the universal purchase path does not include any final page markups 138 for products not offered for sale by the domain name reseller 120.

The domain name registrar 130 may prepare a first plurality of modular cross sell components 135. Each modular cross sell component in the first plurality of modular cross sell components 135 comprises material for at least one product offered for sale by the domain name registrar 130. (Step 200)

The material is hereby defined to be, and is limited to, text that offers to sell the product, text that requests information to determine an eligibility requirement to purchase the product, text that requests information to determine a need level for the product, text that requests information to configure or set-up the product, text that offers two or more tier levels for the product and/or text that offers to activate the product.

In preferred embodiments, each modular cross sell component in the first plurality of modular cross sell components 135 is generic for a plurality of customers and is not specific to any customer 100. These modular cross sell components 135 may be customized to suit each customer 100 by adding additional content 170.

Each modular cross sell component may comprise text that requests information to determine an eligibility requirement to purchase the product, requests information to determine a need level for the product, requests information to configure or set-up the product, offers two or more tier levels for the product and/or offers to activate the product.

Once the first plurality of modular cross sell components 135 have been created and stored within the domain name registrar 130, the first plurality of modular cross sell components 135 may be used to create a universal purchase path. New modular cross sell components 135 may be added or existing modular cross sell components 135 may be removed as desired over time from the first plurality of modular cross sell components 135.

The universal purchase path is universal in the sense that all customers of the domain name registrar 130 use the universal purchase path for all (or selected) product purchases from the domain name registrar 130. The universal purchase path may be customized by using or not using various combinations of modular cross sell components 135 and by changing a content 170 displayed by each of the modular cross sell components 135. In addition, once created and stored, the modular cross sell components 135 may easily be used and customized for any desired number of customers.

A personalization tool may contain a library of modular components. These components may be associated with a set of rules and metadata. These rules and metadata may determine the prioritization of eligible components in a user flow. The decision engine may also leverage the user attribute model to personalize the offering at an individual level.

The real-time decision engine may interpret the component rules, the user attribute models, the business attributes, and available metadata to select the eligible components. Using the priority metadata, the decision engine may order the results for consumption.

Current State Engineering—the components may be defined as Json objects. The rule engine is preferably a java-based rest interface. The eligibility rules may be written in python using rule modules and the rules may be associated to a business attribute that can be leveraged across multiple platforms. The customer attribute model may be built out of an enterprise Hadoop data and consolidated into a tool, such as Cassandra, for real-time storage. The customer facing components may be stored in a content management system.

Figure 20:
FIG. 20 illustrates a possible landing page that allows a customer to enter a domain name into a field to determine whether or not the domain name is available.
Figures 21, 22, 23, 24:
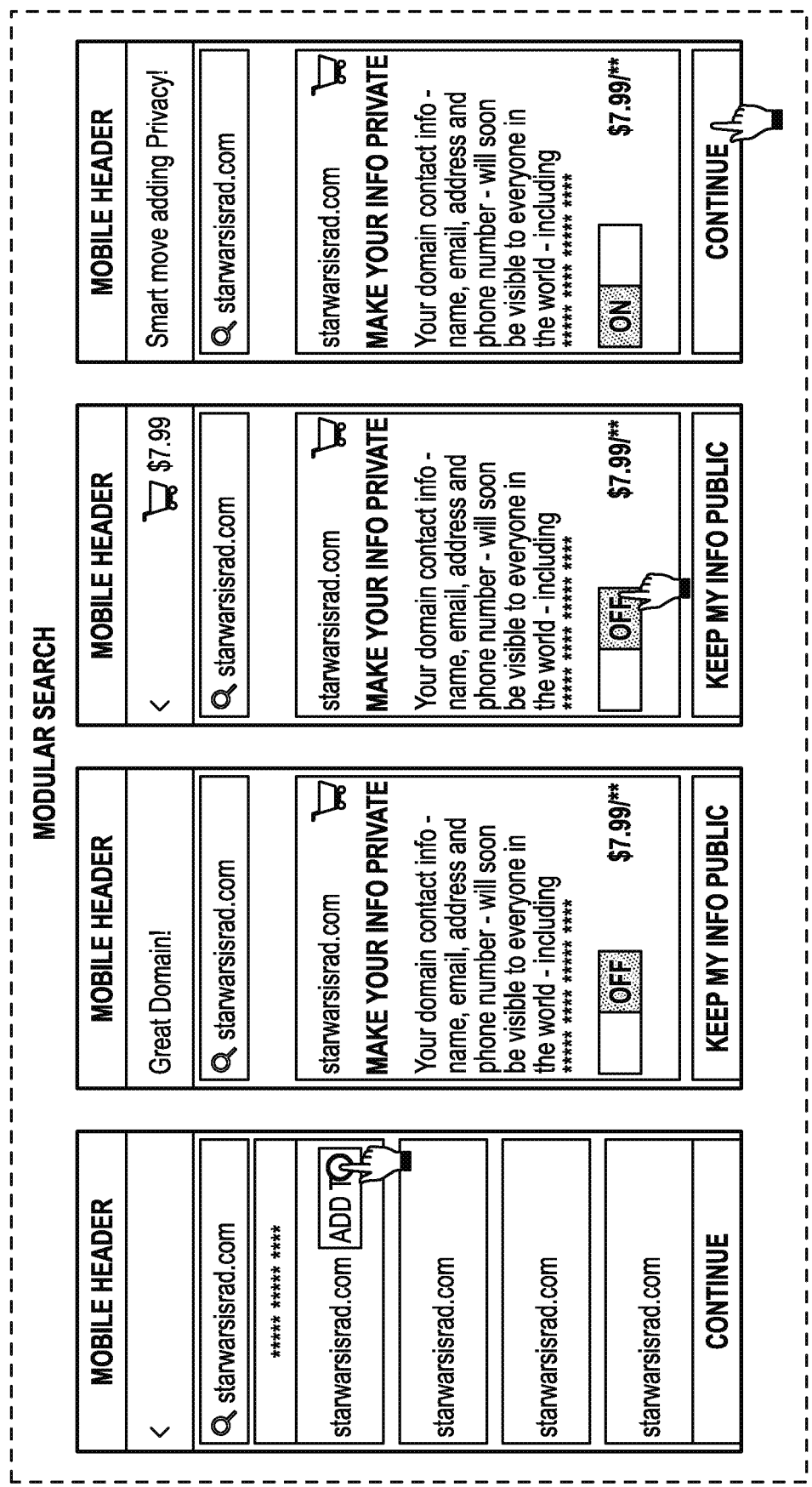
FIGS. 21-24 illustrate a possible first, second, third and fourth final page markups that may be displayed one at a time and in sequence to the customer to allow the customer to select a product. In this case the product is to keep the customer's information private as to the ownership of the domain name.

With reference to FIG. 20, a possible landing page is illustrated that allows the customer 100 to enter a domain name into a field to determine whether or not the domain name is available.

Figure 12:
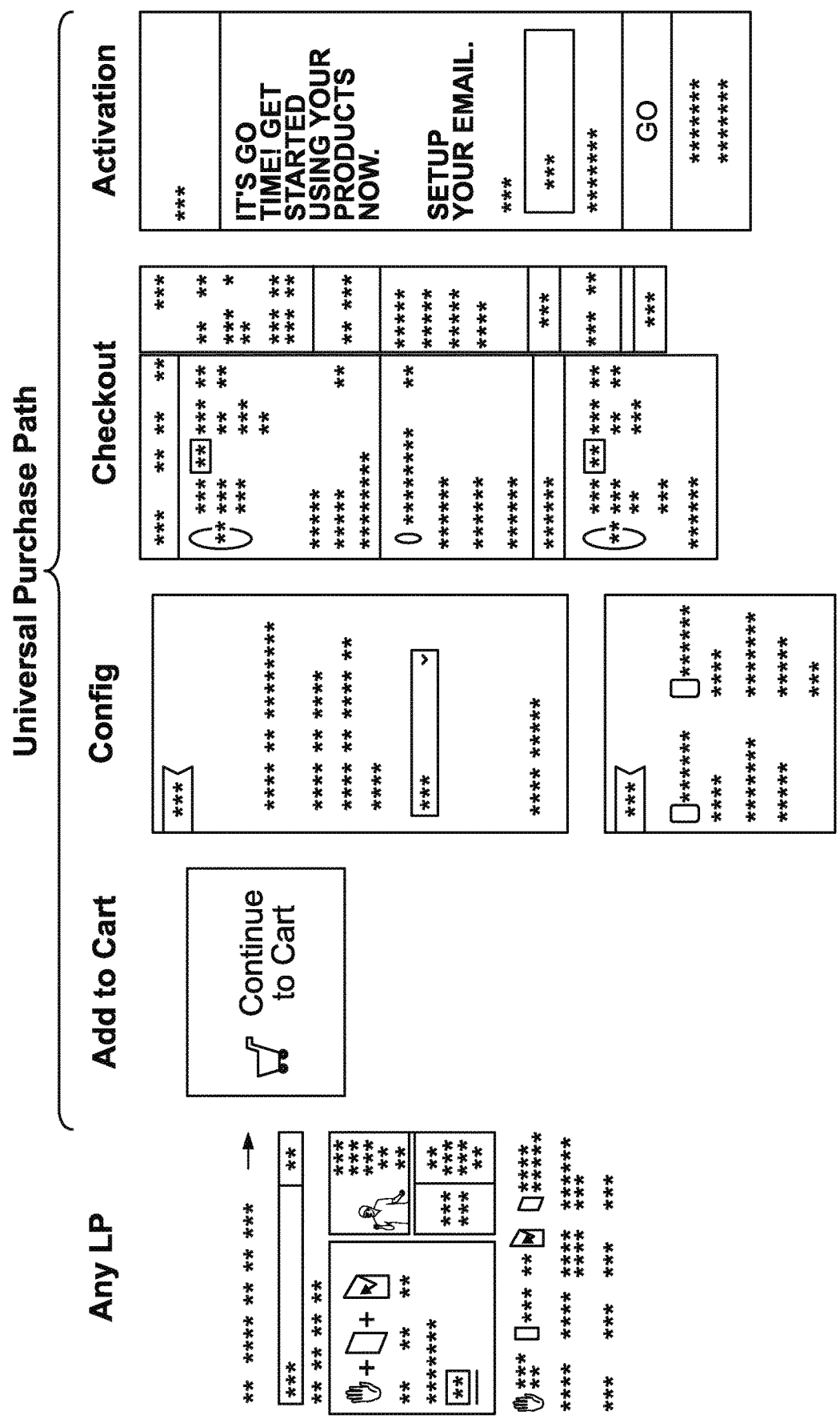
FIG. 12 illustrates that from any landing page (LP) a customer can enter the universal purchase path that includes adding a product to an electronic shopping cart, optionally displaying additional final page markups, created from modular cross sell components and relevant content, that may collect information to select and configure the product, paying for the product during checkout and giving the customer the option to activate any of the customer's products purchased that need to be activated.

With reference to FIG. 12, the customer 100 can enter the universal purchase path from any landing page (LP) (such as the one illustrated in FIG. 20) on a website 132 of the domain name registrar 130 or a website of the domain name reseller 120. The domain name registrar 130 may start the customer 100 on the universal purchase path once the customer 100 has added at least one product 155 to an electronic shopping cart 150. The universal purchase path may display additional final page markups 138 (created from the modular cross sell components 135 and relevant content 170) that collect information to determine eligibility, select and configure the product 155, receive payment for the product 155 during checkout and activate products purchased by the customer 100. Specifically, the website 132 of the domain name reseller 120 of the domain name registrar 130 may receive over a computer network a request to enter a product 155 into an electronic shopping cart 150 by the customer 100 using a client device 110. (Step 210)

The domain name registrar 130 may create a second plurality of modular cross sell components 135 that is a subset of the first plurality of modular cross sell components 135 by filtering out one or more modular cross sell components 135 in the first plurality of modular cross sell components 135 that has material for a product not sold by the domain name reseller 120. (Step 220) This step would not need to be performed if the customer 100 contacts the domain name registrar 130 directly, and not through a domain name reseller 120.

Figure 4:
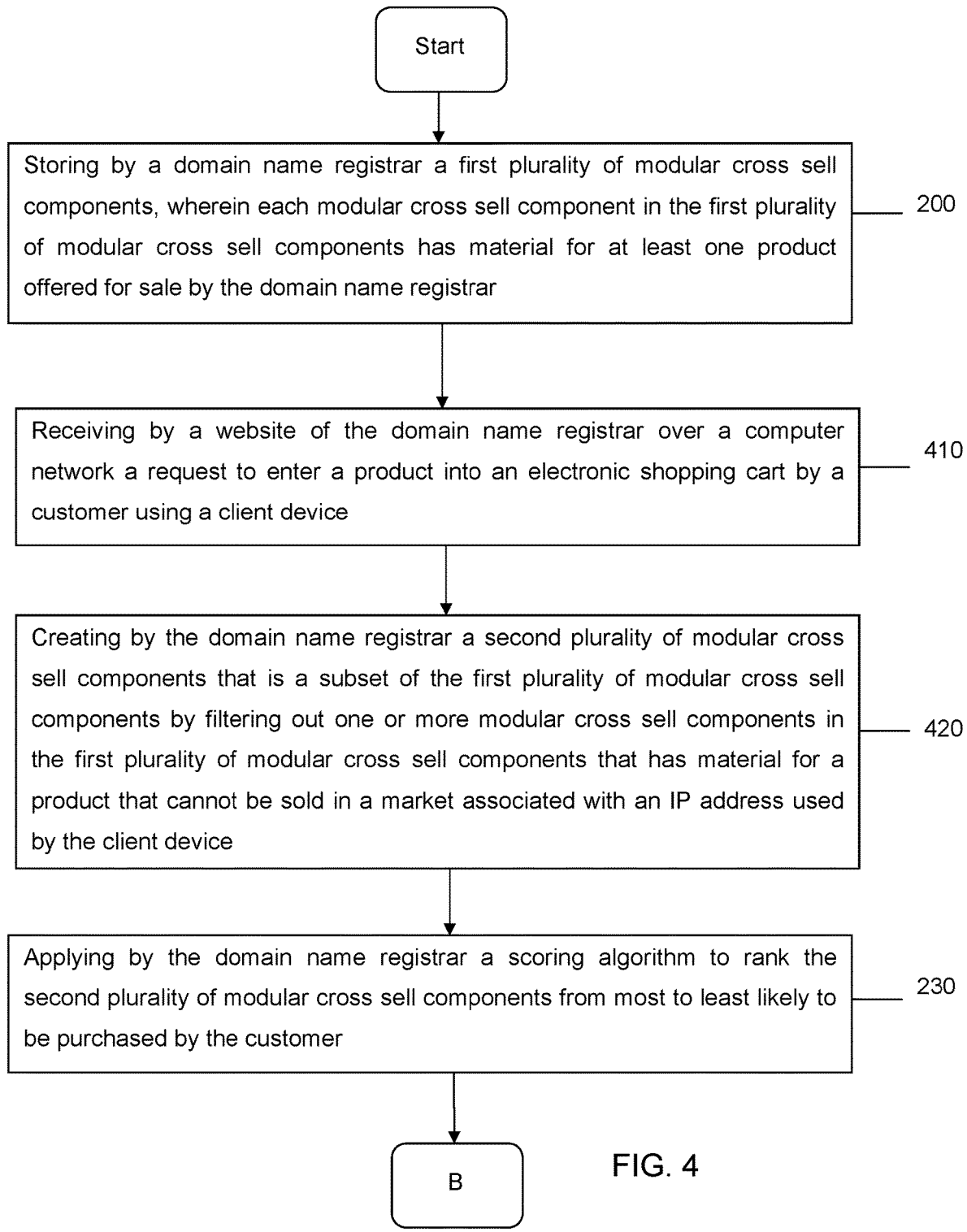
FIGS. 4-5 are a flow-chart illustrating an embodiment of the invention where a customer selects a product on a website of a domain name registrar and a customized universal purchase path at the domain name registrar does not include final page markups (created from modular cross sell components) for products that cannot be sold in a market associated with an IP address used by the client device of the customer.
Figure 5:
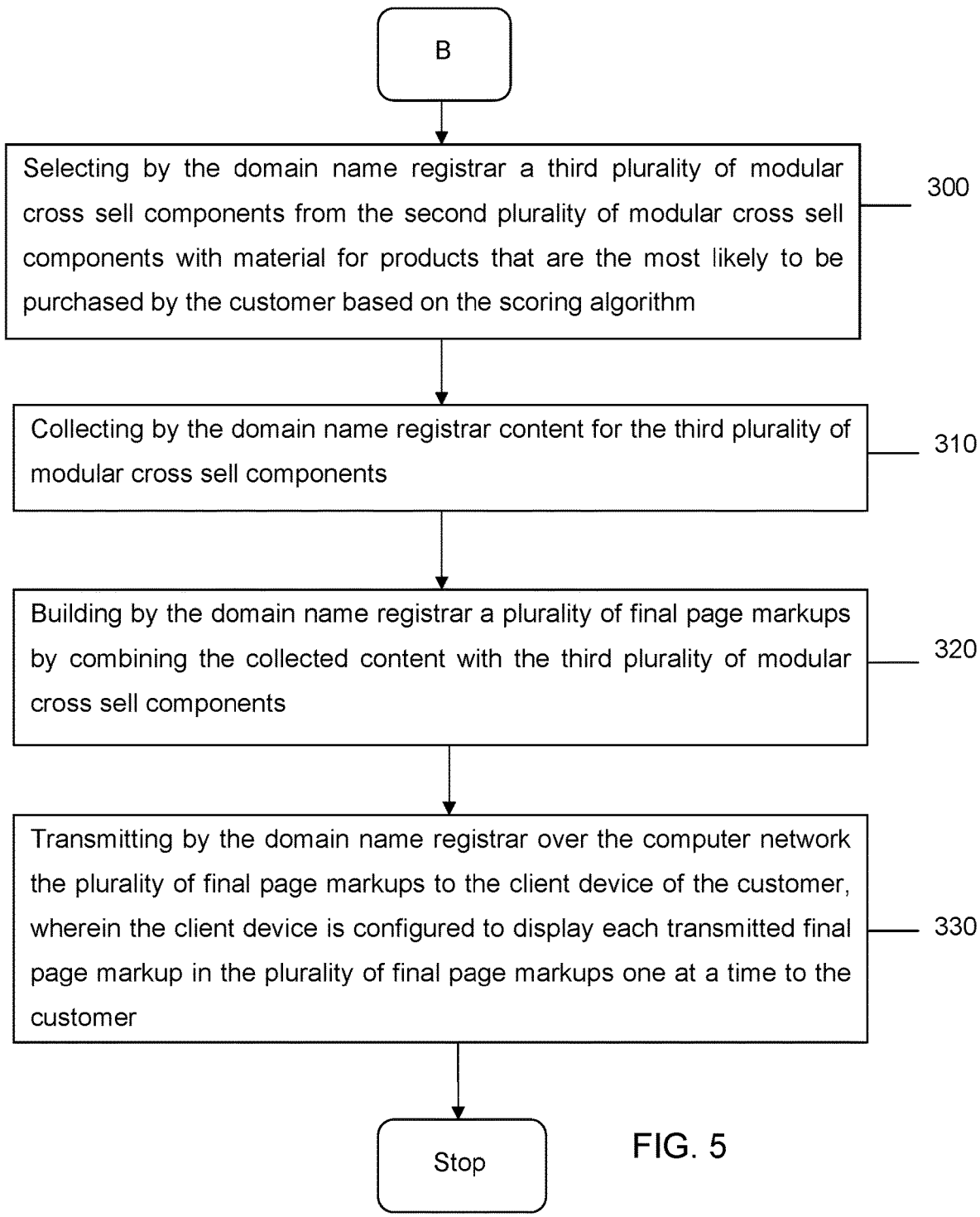

With reference to FIGS. 4-5, the domain name registrar 130 may create the second plurality of modular cross sell components 135 that is a subset of the first plurality of modular cross sell components 135 by filtering out one or more modular cross sell components 135 in the first plurality of modular cross sell components 135 that has material for a product that cannot be sold in a market associated with an IP address used by the client device 110. (Step 420)

Figure 6:
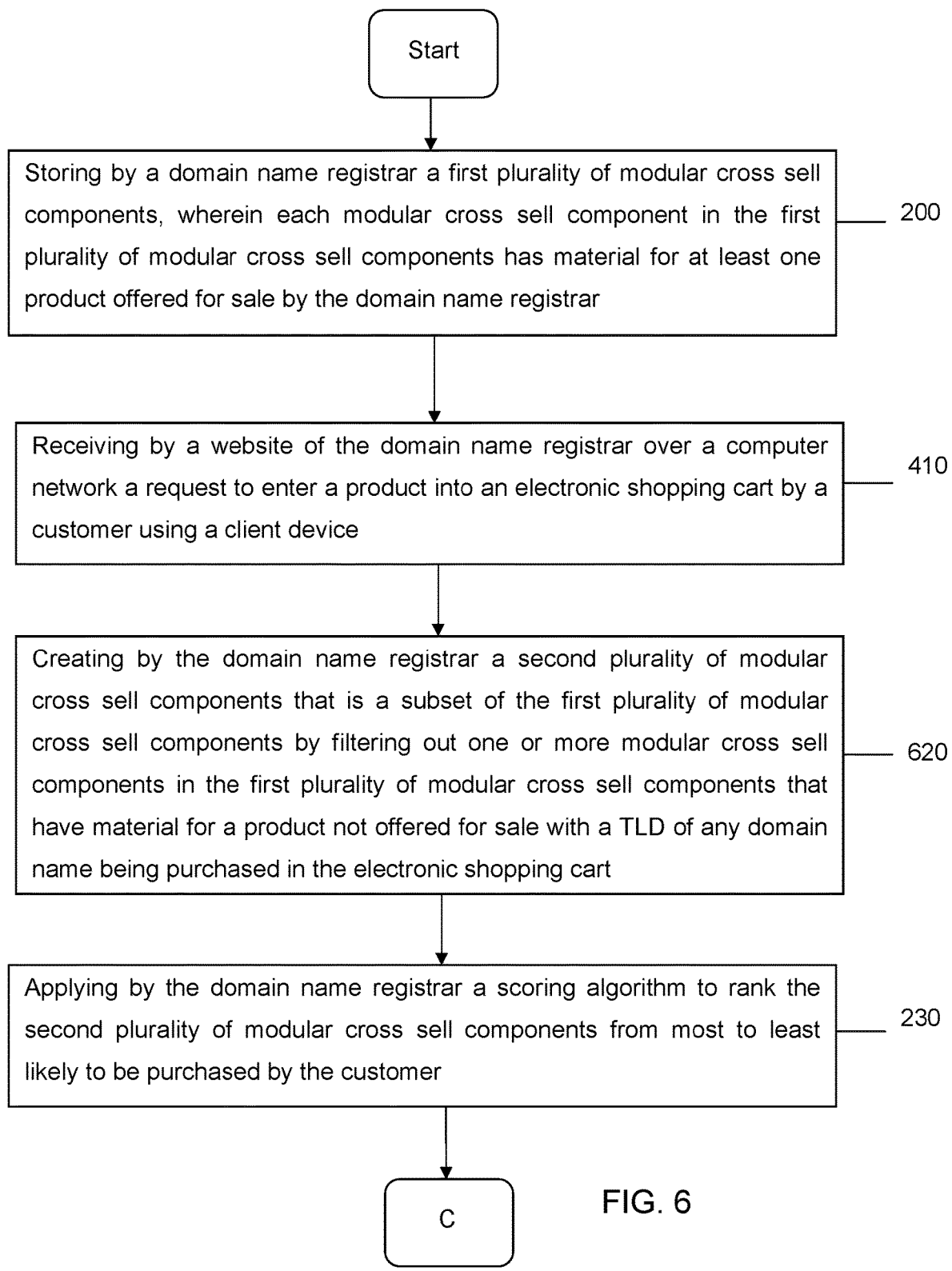
FIGS. 6-7 are a flow-chart illustrating an embodiment of the invention where a customer selects a product on a website of a domain name registrar and a customized universal purchase path at the domain name registrar does not include final page markups (created from modular cross sell components and relevant content) for products that cannot be sold in a market associated with an IP address used by the client device of the customer.
Figure 7:
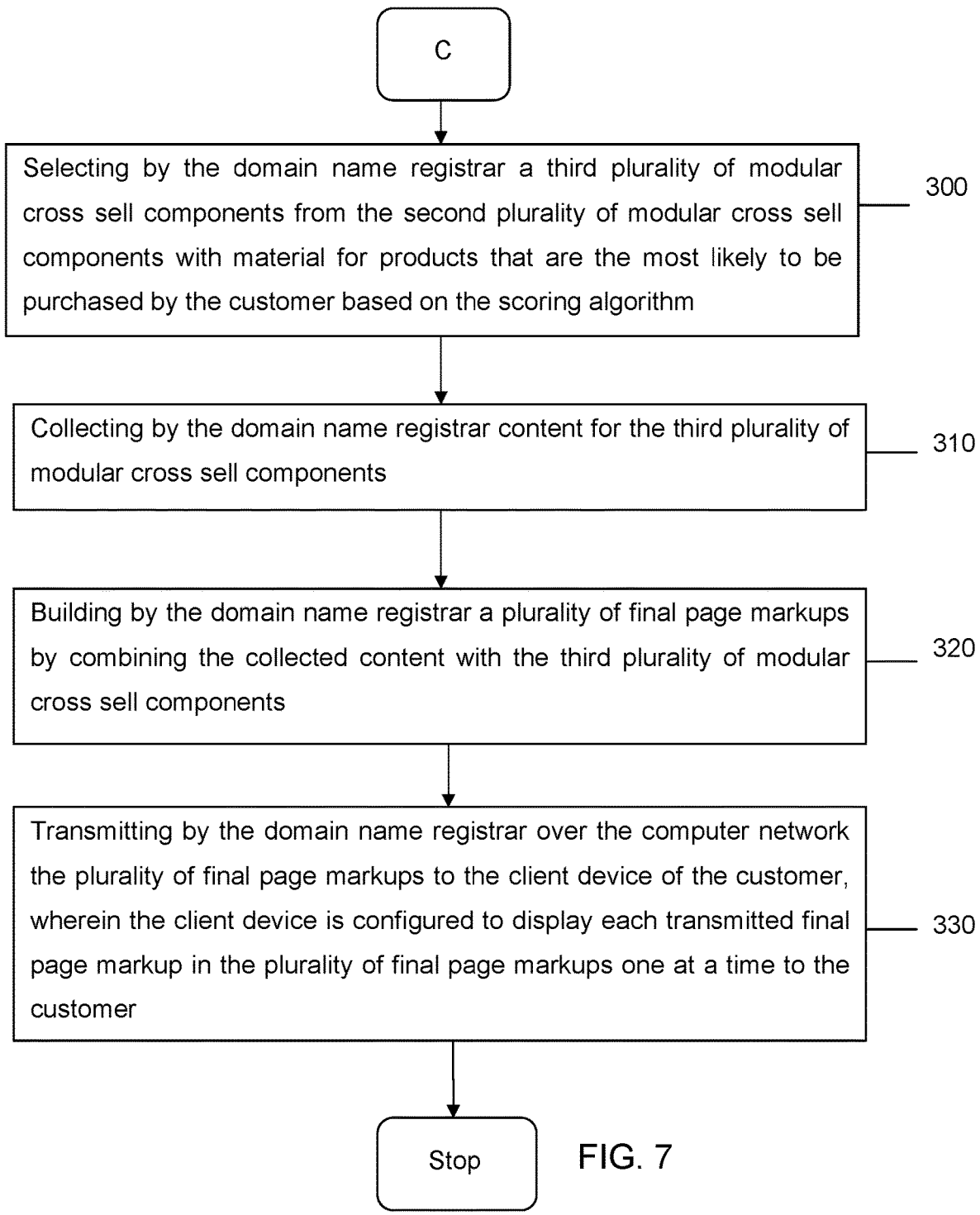
Figure 8:
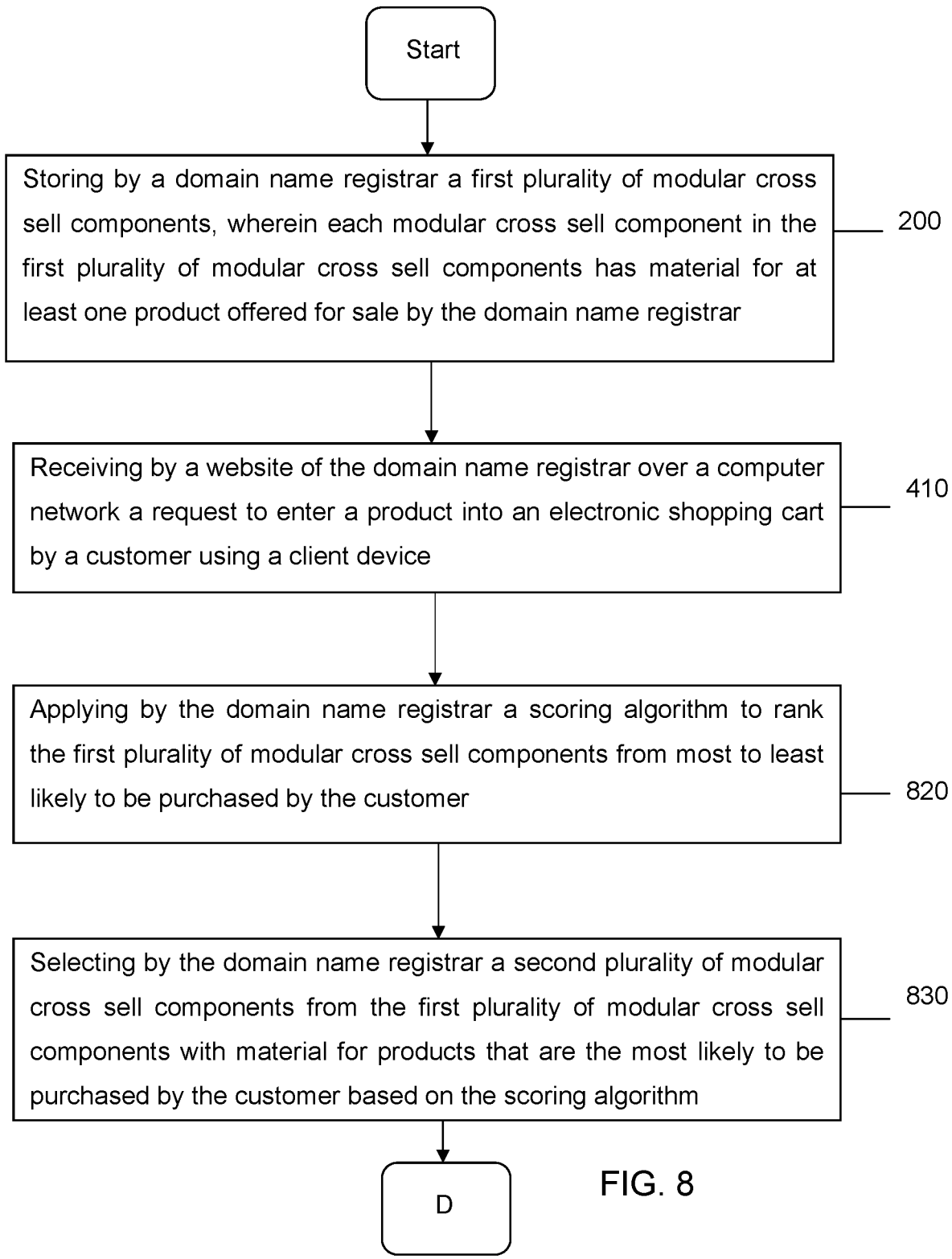
FIGS. 8-11 are a flow-chart illustrating an embodiment of the invention where a customer selects a product on a website of a domain name registrar and the domain name registrar determines whether to display or not display final page markups (created from modular cross sell components and relevant content) based on a probability the customer will complete the purchase if shown the final page markups.
Figure 9:
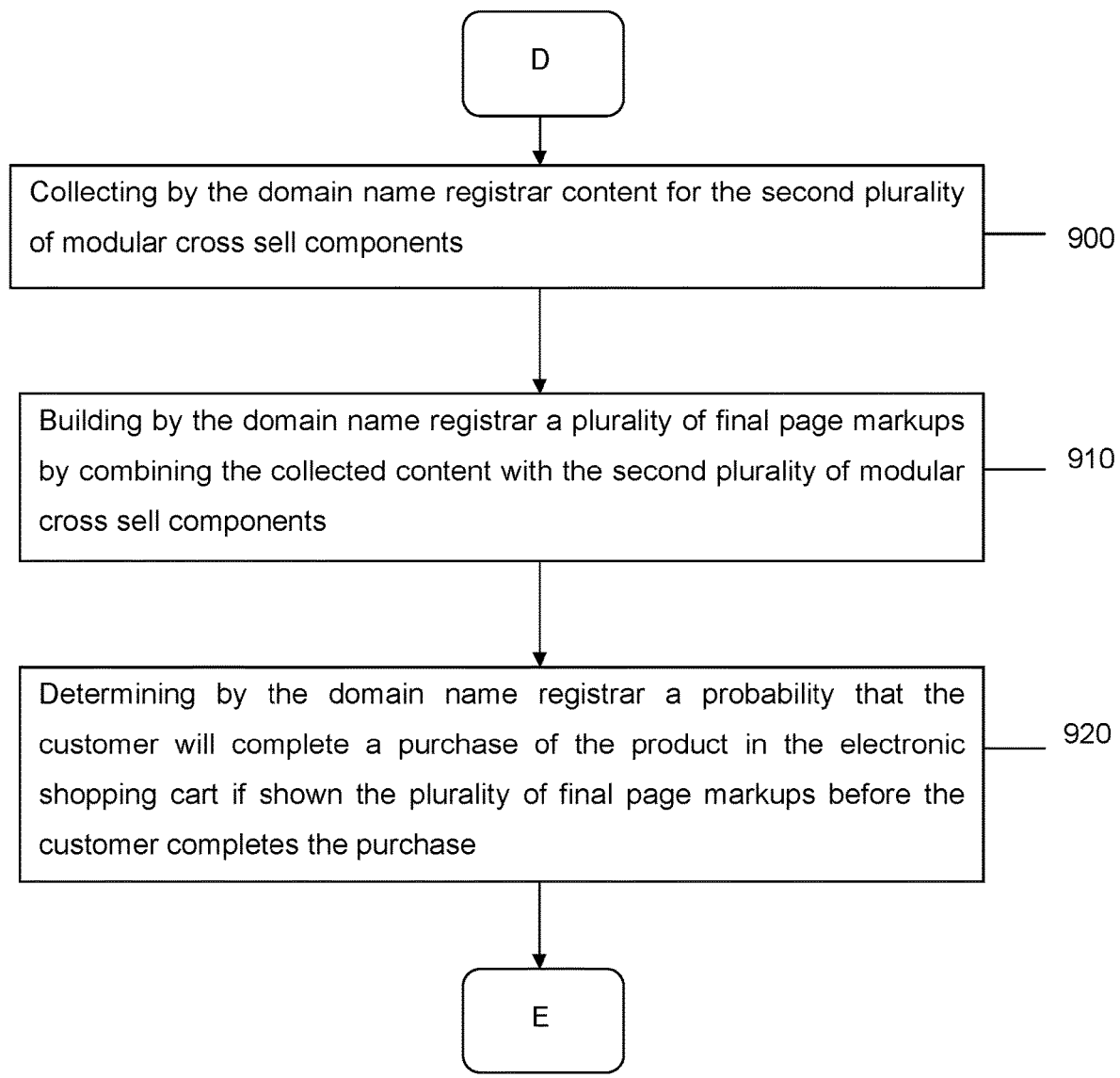
Figure 10:
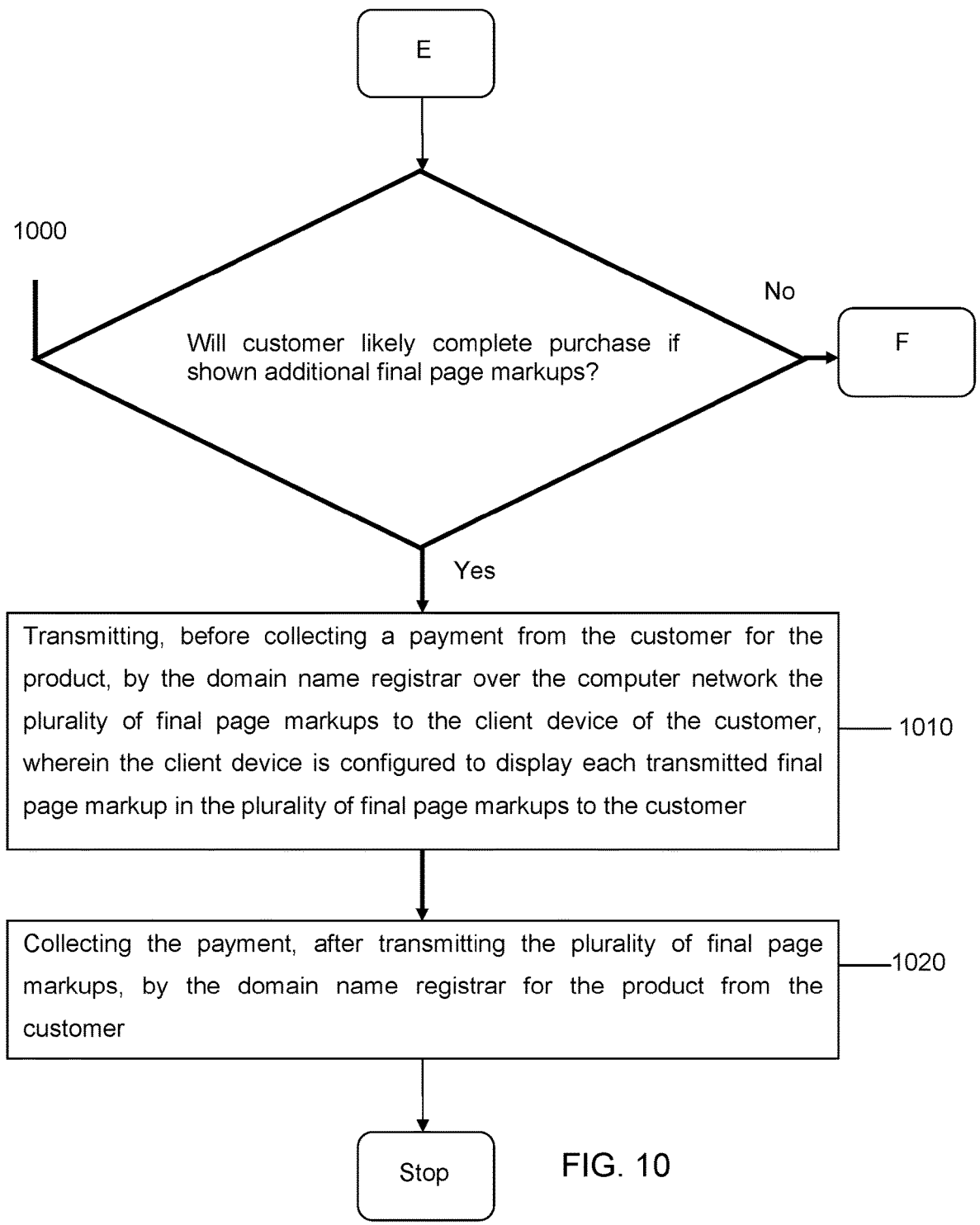
Figure 11:
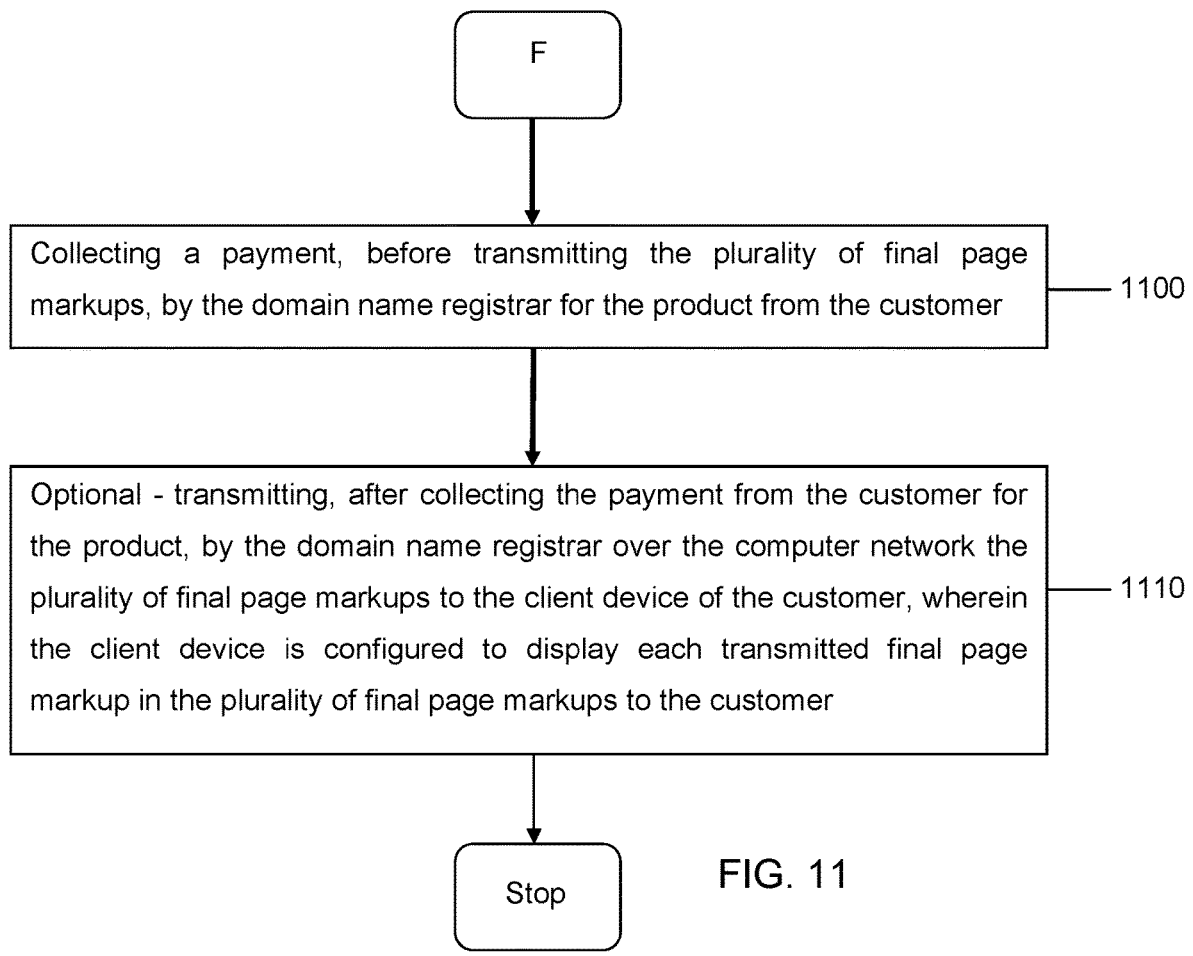

With reference to FIGS. 6-7, the domain name registrar 130 may create the second plurality of modular cross sell components 135 that is a subset of the first plurality of modular cross sell components 135 by filtering out one or more modular cross sell components 135 in the first plurality of modular cross sell components 135 that has material for a product not offered for sale with a TLD of any domain name being purchased in the electronic shopping cart 150. (Step 620)

In preferred embodiments, Step 220 (assuming the customer 100 used a domain name reseller 120 to contact the domain name registrar 130), Step 420 and Step 620 are all used (although some combination thereof may also be used) to filtered out modular cross sell components 135 from the first plurality of modular cross sell components 135 to create the second plurality of modular cross sell components 135. In other words, one or more of the following business rules may be followed: remove modular cross sell components 135 with material for products that are not sold by the reseller 120, remove modular cross sell components 135 with material for products that can't be sold in the market or by IP Address location and/or remove modular cross sell components 135 for products that can't be attached to the domain TLD being purchased.

Figure 39:
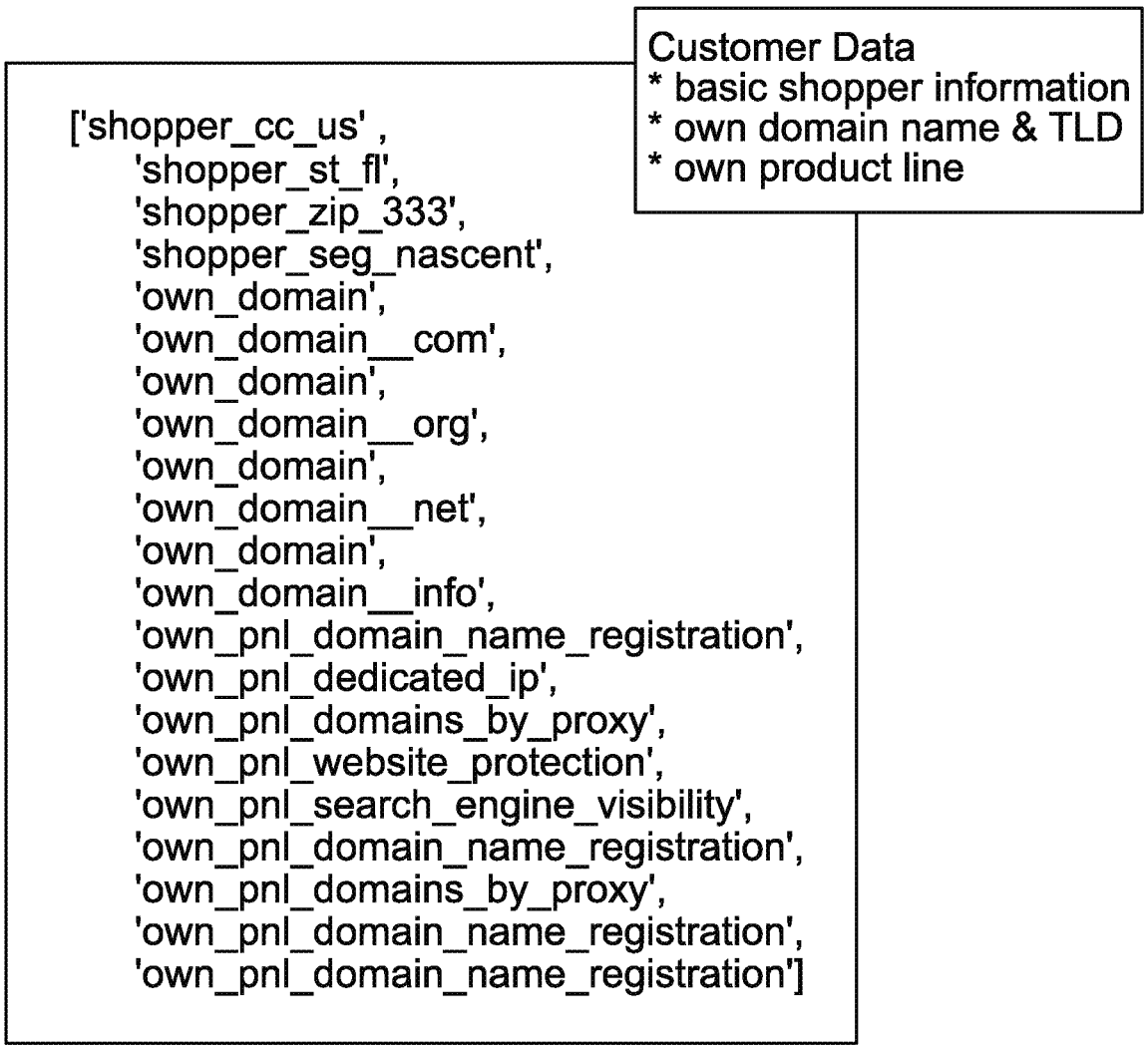

With reference to FIGS. 34-38, the domain name registrar 130 may apply a scoring algorithm 140 to rank the second plurality of modular cross sell components 135 from most to least likely to be purchased by the customer 100. (Step 230) With reference to FIGS. 39-40, a non-limiting example of model data is illustrated that may be used by the scoring algorithm 140 in making product recommendations.

The process for using the scoring algorithm 140 on the second plurality of modular cross sell components 135 will now be discussed. The website 132 of the domain name registrar 130 may make a real-time call to a back-end process passing context data about the customer 100 visit. Non-limiting examples of the context data include the customer 100 ID, reseller ID (if there is one), market, customer IP address, session ID, etc.

The process applies the scoring algorithm 140 to rank the second plurality of modular cross sell components 135 from most to least important or most to least likely to be purchased for the customer 100.

The scoring algorithm 140 may use real-time traffic data, recent websites or webpages visited, domain name search requests entered by the customer 100, geographical and local time information for the customer 100, user agents related to the browser 112, the client device 110, and the OS type used by the client device 110 for the customer 100, recent products added to the electronic shopping cart 150 and/or purchased by the customer 100, customer information, customer demographic data such as market segment, geo-zipcode, age of the customer 100, spending data of the customer 100, business type engaged in by the customer 100, etc., the domain name portfolio for the customer 100 and/or domain name registrar products owned by the customer 100.

The scoring algorithm 140 is preferably a machine learning algorithm and uses recommendation techniques. The scoring algorithm 140 may use gradient boosted trees, profound textual features and techniques such as TF-IDF and topic modeling. The scoring algorithm 140 may also use offline evaluation, such as, as non-limiting examples, cross-validation and f-1 measurement.

Additional Algorithms: other scoring algorithms associated with product ownerships, lifetime value, industry, segmentation, churn, renewal, etc. may be used. These algorithms may be online or offline and may be fed into the customer attribute model.

UPP Algorithm: recent visits to the site, the pages that are visited, what has been added to the checkout, time spent on the site, and the market/IP location of the customer may all be used as part of the UPP algorithm. The browser and device may also be submitted as features into the scoring algorithm.

The scoring algorithm 140 returns or identifies the highest ranked modular cross sell components 135 for the customer 100 to the web site. The domain name registrar 130 may select a third plurality of modular cross sell components 135 from the second plurality of modular cross sell components 135 with material for products that are the most likely to be purchased by the customer 100 based on the scoring algorithm 140. (Step 300) As a specific example, the domain name registrar 130 may decide to display the modular cross sell components 135 for the five most likely to be purchased products by the customer 100.

The domain name registrar 130 may collect content 170 for the third plurality of modular cross sell components 135. (Step 310) The domain name registrar 130 may build a plurality of final page markups 138 by combining the collected content 170 with the third plurality of modular cross sell components 135. (Step 320)

The content may be contained in a content management system and may be utilized based upon the scoring algorithm. There may be a rendering service on top of the content system that returns the built content into the modular components. The rendering services may take the content and parses the content for dynamic tokens that are replaced with dynamic content such as price, offers, names, etc. The rendering service may also tag the content for tracking which enables machine learning.

The domain name registrar 130 may transmit over the computer network the plurality of final page markups 138 to the client device 110 of the customer 100. The client device 110 is preferably configured to display each transmitted final page markup 116 in the plurality of final page markups 138 in sequential order one at a time to the customer 100. (Step 330)

In some embodiments, the plurality of final page markups 138 may include a first final page markup 116 configured to offer a second product. The second product may be different from the product in the electronic shopping cart 150. The plurality of final page markups 138 may also include a second final page markup 116 configured to receive data directly from the customer 100 regarding the second product. The plurality of final page markups 138 may also include a third final page markup 116 configured to receive a tier selection from the customer 100 for the second product. The first, second and third final page markups 138 are preferably different final page markups 138, meaning there are three separate final page markups 138.

In some embodiments, the plurality of final page markups 138 may include a first final page markup 116 configured to request information from the customer 100 to configure the product 155. The plurality of final page markups 138 may also include a second final page markup 116 configured to collect a payment from the customer 100 for the product 155. The plurality of final page markups 138 may also include a third final page markup 116 configured to receive an activation request from the customer 100 for the product 155. As in the previous embodiment, the first, second and third final page markups 138 may all be different final page markups 138.

With reference to FIGS. 21-24, a possible first, second, third and fourth final page markups 138 that may be displayed one at a time and in sequence to the customer 100 to allow the customer 100 to select a product. In this case the product is to keep the customer's information private as to the ownership of the domain name.

With reference to FIGS. 25-26, a possible first and second final page markups 138 are illustrated that may be displayed one at a time and in sequence to the customer 100 to allow the customer 100 to purchase additional products, possible products related to the purchase of a domain name or hosting services 142.

Figures 27, 28, 29:
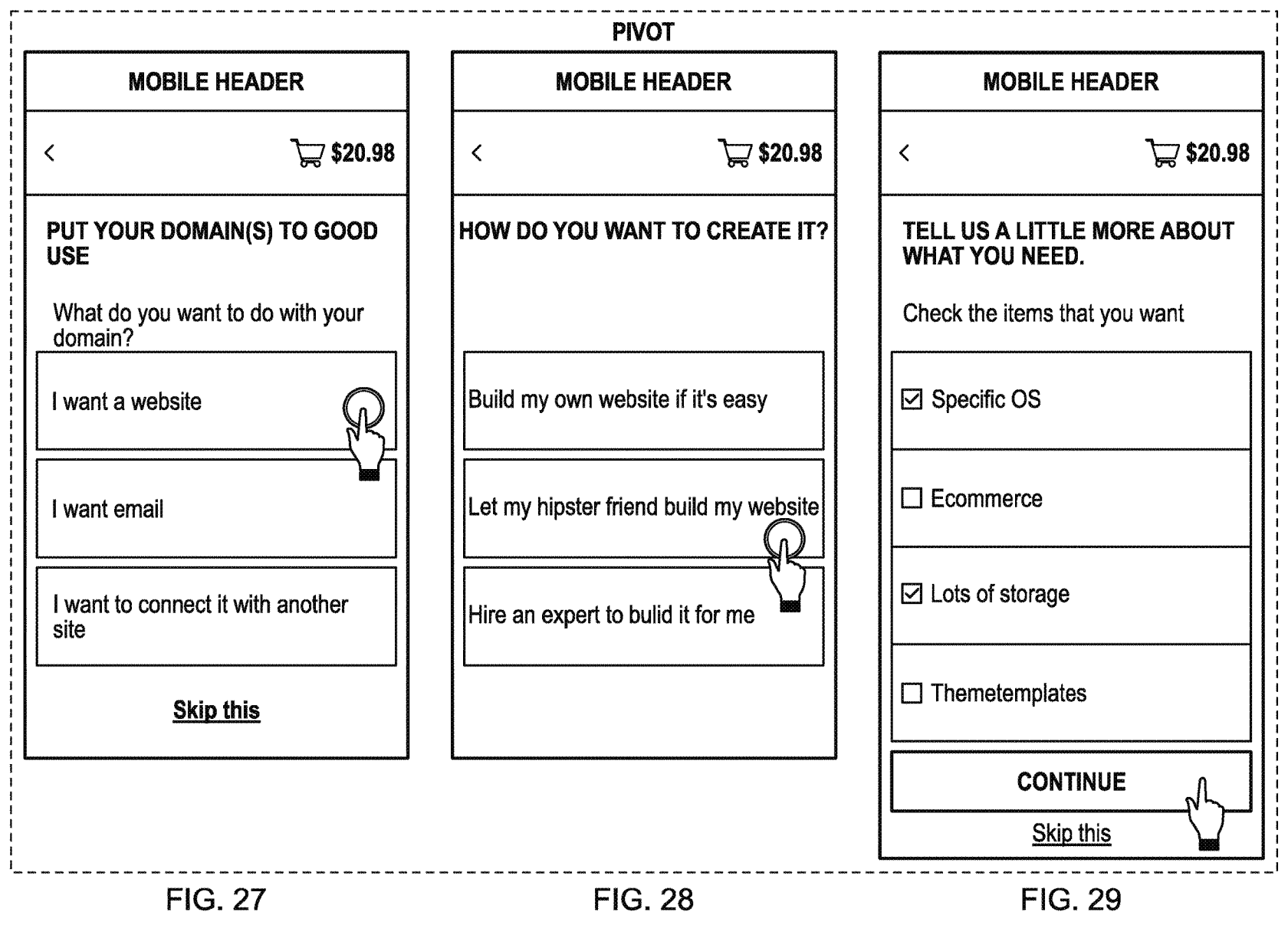

With reference to FIGS. 27-29, a possible first, second and third final page markups 138 are illustrated that may be displayed to the customer 100 to allow the customer 100 to select additional products related to the purchase of a domain name by the customer 100. The second final page markup 116 chosen to be displayed to the customer 100 is dependent on the actions of the customer 100 with the first final page markup 116 and the third final page markup 116 chosen to be displayed to the customer 100 is dependent on the actions of the customer 100 with the second final page markup 116. Thus, the modular cross sell components 135/final page markups 138 may be arranged in a hierarchical tree structure and the actions of the customer 100 may determine which final page markups 138 are shown and which final page markups 138 are not shown to the customer 100. As an example, FIG. 27 has material about a website, email and a domain name. If the customer 100 selects a desire for a website, the final page markup 116 illustrated in FIG. 28 may be displayed to the customer 100 that has material for a website.

With reference to FIGS. 30-31, a first and a second final page markup 116 may be displayed to the customer 100, i.e., communicated to the client device 110 of the customer 100, to receive a selection of a tier for a product 155 and receive a confirmation of placing the additional product 155 into the electronic shopping cart 150 of the customer 100. Specifically, FIG. 30 is an example of a final page markup 116 offering the customer 100 the option to select different tier levels of a website hosting plan (hosting service 142). The final page markup 116 may also be configured to allow the customer 100 to select one of the tiers offered for sale. In this example, the customer 100 selected Deluxe Hosting as seen by the icon hovering over the Deluxe Hosting selection.

FIG. 31 is an example of a final page markup 116 that is displayed to the customer 100 only if the customer 100 selected Deluxe Hosting in FIG. 30. The final page markup 116 in FIG. 31 allows the customer 100 to confirm that the customer 100 wants to add Deluxe Hosting to the electronic shopping cart 150 of the customer 100. Thus, FIGS. 30-31 illustrate an example of how the final page markups 138 may be displayed to the customer 100 based on the actions of the customer 100.

Figure 32:
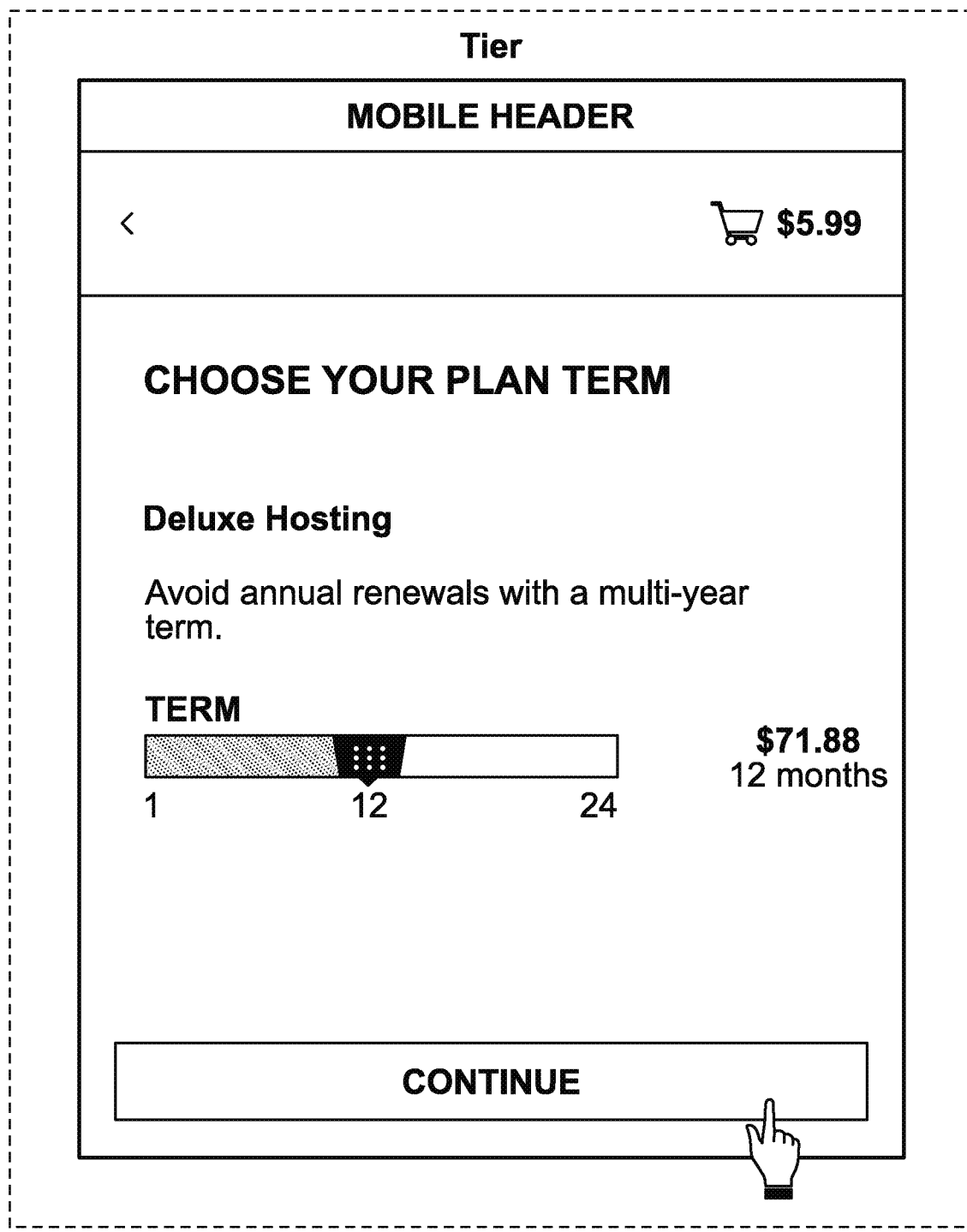
FIG. 32 illustrates a final page markup that may be used to receive a selection from the customer for a length of time the customer desires to purchase a product, in this case how long the customer desires to purchase deluxe hosting from the domain name registrar (that also sells website hosting services).

With reference to FIG. 32, a final page markup 116 is illustrated that may be used to receive a selection from the customer 100 for a length of time the customer 100 desires to purchase a product 155. Specifically in this example, the final page markup 116 allows the customer 100 to select how long the customer 100 desires to purchase deluxe hosting from the domain name registrar 130 (that also sells website hosting services 142).

Figure 33:
FIG. 33 illustrates a final page markup that represents a confirmation and an activation of a product purchased by the customer from the domain name registrar.
Figure 34:
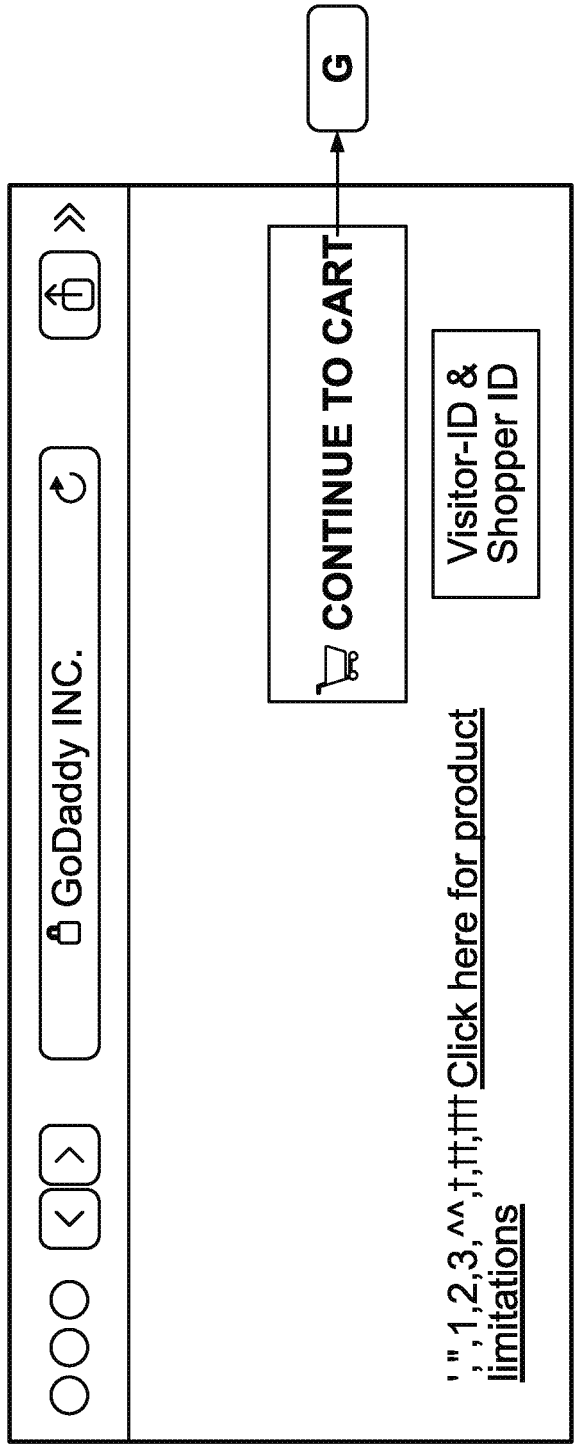
FIGS. 34-38 illustrate a scoring algorithm for making product recommendations.
Figure 35:
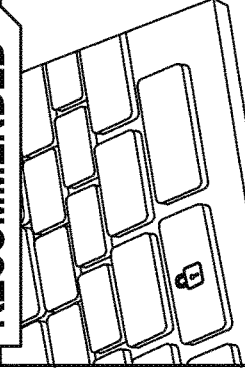
Figure 36:
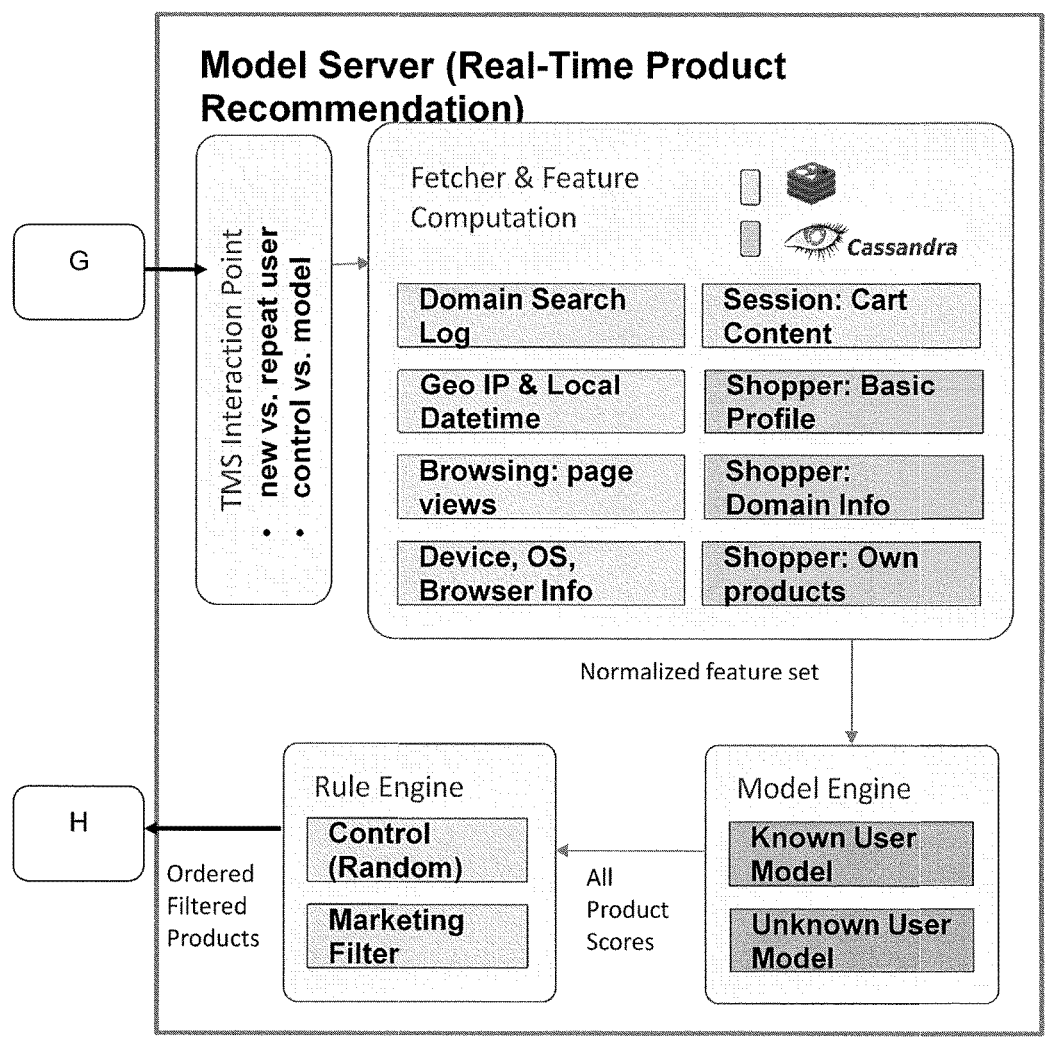
Figure 37:
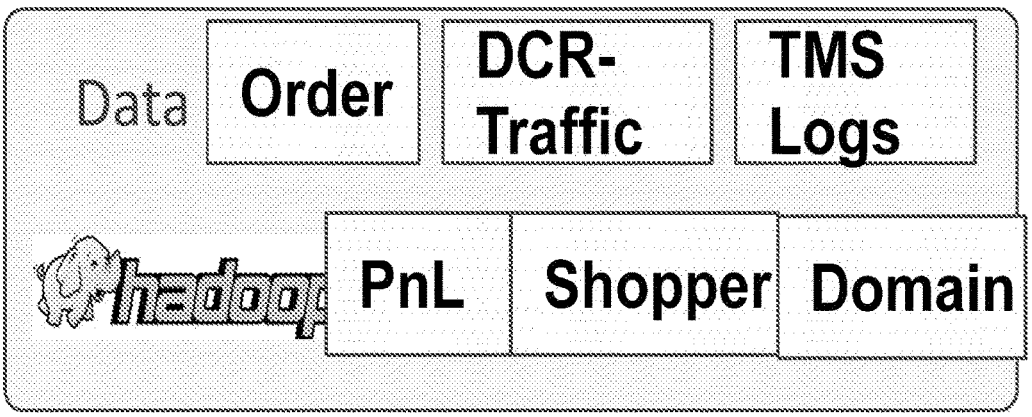
Figure 38:
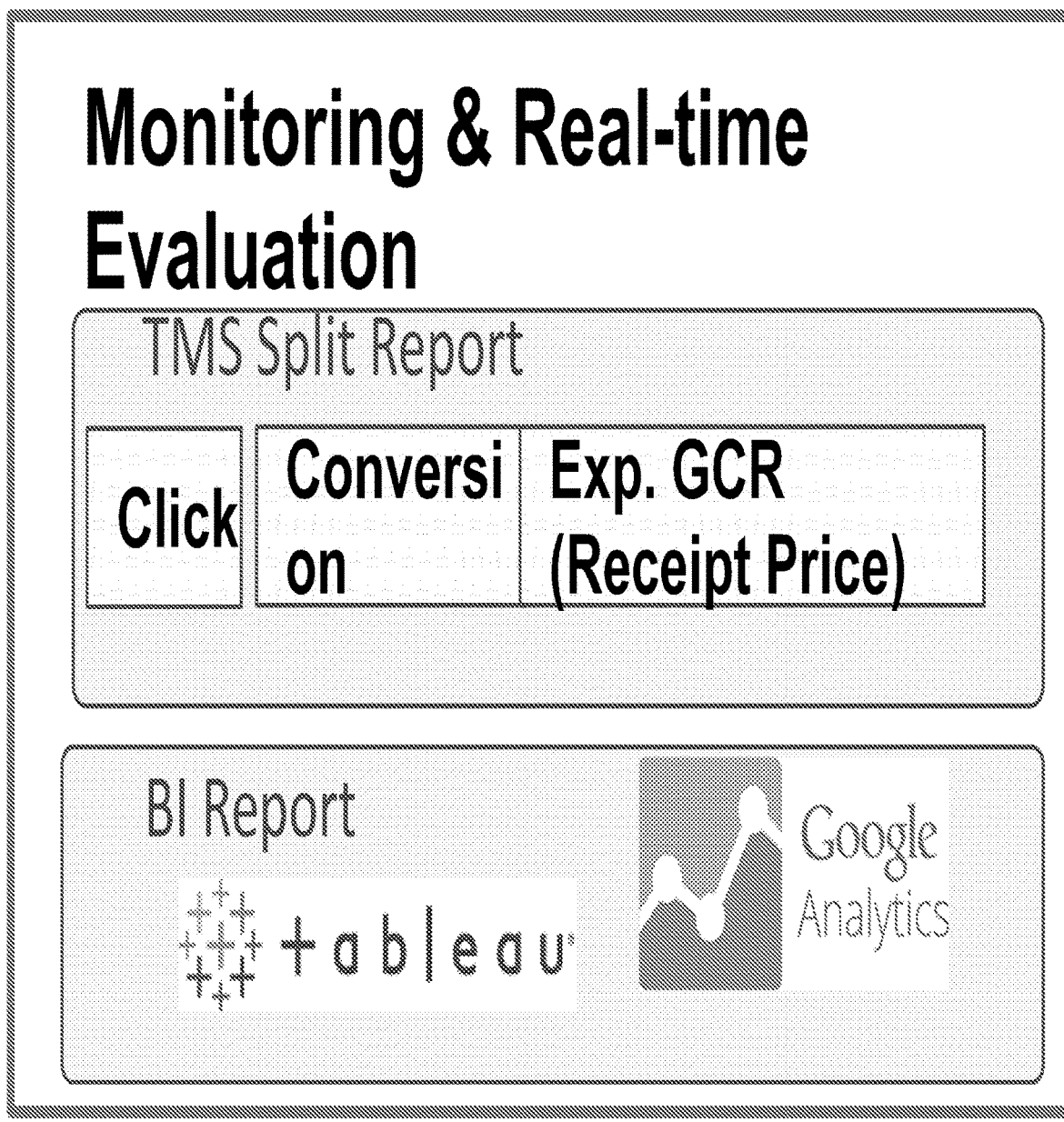

With reference to FIG. 33, a final page markup 116 is illustrated, immediately after the purchase of a product 155, that may be used to represents a confirmation and an activation option for the product 155 purchased by the customer 100 from the domain name registrar 130. In this example, the customer 100 is given the option, immediately after completing the purchase, to start building a website for a hosting plan (hosting service 142) that was purchased by the customer 100.

With reference to FIGS. 8-11, another embodiment of the invention will be described. As in the previous embodiments, the customer 100 may select a product 155 on a website 132 of a domain name registrar 130. In this embodiment, the domain name registrar 130 determines whether or not to display final page markups 138 for additional products based on a probability the customer 100 will complete the purchase of the original product 155 if shown the final page markups 138 for the additional products. The universal purchase path for the customer 100 may be optimized for conversions (completing the purchase of the product 155) by not displaying final page markups 138 for the upgraded products and/or for additional products. At other times the same universal purchase path may be optimized for additional sales (LTV) for the customer 100 if additional products (preferably related to the original product 155) or upgraded products (upgrades of the original product 155) are offered to the customer 100.

The universal purchase path has the ability to be easily modified and customized based on an analysis of the customer 100 and/or the product 155 being purchased. As non-limiting examples, data may be stored that shows the customer 100 has a history of adding products to an electronic shopping cart 150, but only rarely completing the purchase. For such a customer 100, the domain name registrar 130 may desire to complete the transaction for the product 155 as quickly as possible by not displaying upgraded or additional products in final page markups 138 to the customer 100. As another example, the customer 100 may be purchasing a very cheap or discounted item (such as a discounted domain name popular with domain name speculators) and the domain name registrar 130 may know that customers purchasing this type of product 155 rarely want upgrades or additional products and thus the domain name registrar 130 may also not display upgraded or additional products in final page markups 138 to the customer 100 purchasing this type of product 155.

Alternatively, the customer 100 may be known, from past purchases, to purchase many upgraded and/or additional products. In such a case, the domain name registrar 130 may desire to display multiple upgrade options and multiple additional products before the customer 100 completes the purchase. As another example, certain products may be known that if purchased, a customer 100 is likely to want upgrade options as well as one or more related additional products. In this case, the domain name registrar 130 may desire to display multiple upgrade options and multiple additional products to the customer 100 before the customer 100 completes the purchase of the original product 155.

Another method of practicing the invention will now be described that may be used to maximize conversion rates for certain customers and certain products and maximize total sales for other customers and other products. As previously described, this method may start with the domain name registrar 130 creating and storing a first plurality of modular cross sell components 135. Each modular cross sell component in the first plurality of modular cross sell components 135 may have material for at least one product offered for sale by the domain name registrar 130. (Step 200)

A website 132 of the domain name registrar 130 may receive over a computer network a request to enter a product 155 into an electronic shopping cart 150 by the customer 100 using the client device 110. (Step 410)

The domain name registrar 130 may determine whether a probability that the customer 100 will complete a purchase of the product 155 in the electronic shopping cart 150 if shown a final page markup 116 for an upgrade or an additional product before the customer 100 completes the purchase is over or under a predefined and adjustable threshold. (Steps 920 and 1000)

If the probability that the customer 100 will complete the purchase of the product 155 is over the threshold, additional final page markups 138 suggesting upgrades and/or additional products may be shown to the customer 100 before the customer 100 completes the purchase of the product 155 in the electronic shopping cart 150. On the other hand, if the probability that the customer 100 will complete the purchase of the product 155 is under the threshold, additional final page markups 138 suggesting upgrades and/or additional products are NOT shown to the customer 100 before the customer 100 completes the purchase of the product 155 in the electronic shopping cart 150.

As a non-limiting example, if the domain name registrar 130 determines that a customer 100 will complete the transaction 90% of the time (and the threshold is set at 60% as an example), then the domain name registrar 130 may display one or more final page markups 138 to the customer 100 for upgraded and/or additional products. A higher probability (possibly compared to the threshold value) may be used by the domain name registrar 130 to trigger additional final page markups 138 being sent to the customer 100, while a lower probability (possibly compared to the threshold value) may be used by the domain name registrar 130 to send fewer or possibly no additional final page markups 138 if the probability is below the threshold. The threshold may be adjusted, preferably automatically and in real-time by a hardware server, to maximize the total or net revenue received by the domain name registrar 130.

If the probability the customer 100 will complete the transaction is over the threshold (meaning the domain name registrar 130 is anticipating the customer 100 will compete the transaction), the domain name registrar 130 may desire to determine which upgrades and/or additional products (and how many upgrades and how many additional products) are to be transmitted and displayed to the customer 100. The domain name registrar 130 may apply a scoring algorithm 140 to rank the first plurality of modular cross sell components 135 from most to least likely to be purchased by the customer 100 as previously described. (Step 820) The domain name registrar 130 may select a second plurality of modular cross sell components 135 from the first plurality of modular cross sell components 135 with material for products that are the most likely to be upgraded and/or purchased by the customer 100 based on the scoring algorithm 140. (Step 830) The domain name registrar 130 may collect content 170 for the second plurality of modular cross sell components 135. (Step 900) The domain name registrar 130 may then build a plurality of final page markups 138 by combining the collected content 170 with the second plurality of modular cross sell components 135. (Step 910) The domain name registrar 130 may transmit, before collecting a payment for the product 155 from the customer 100, over the computer network the plurality of final page markups 138 to the client device 110 of the customer 100. The client device 110 may be configured to display each transmitted final page markup 116 in the plurality of final page markups 138 one at a time to the customer 100, and (Step 1010) The domain name registrar 130 may collect the payment for the product 155 (and any additional upgrades or additional selected products) from the customer 100. (Step 1020)

Alternatively, if the probability the customer 100 will complete the transaction is under the threshold (meaning the domain name registrar 130 is anticipating the customer 100 will NOT complete the transaction if shown upgrades or additional products), the domain name registrar 130 may decide to NOT transmit over the computer network any final page markups 138 for upgrades or additional products to the client device 110 of the customer 100. (Step 1110) Instead of sending final page markups 138 for upgrades or additional products, the domain name registrar 130 may immediately collect the payment for the product 155 in the electronic shopping cart 150 from the customer 100 in order to maximize the conversion rate. (Step 1100)

Figure 14:
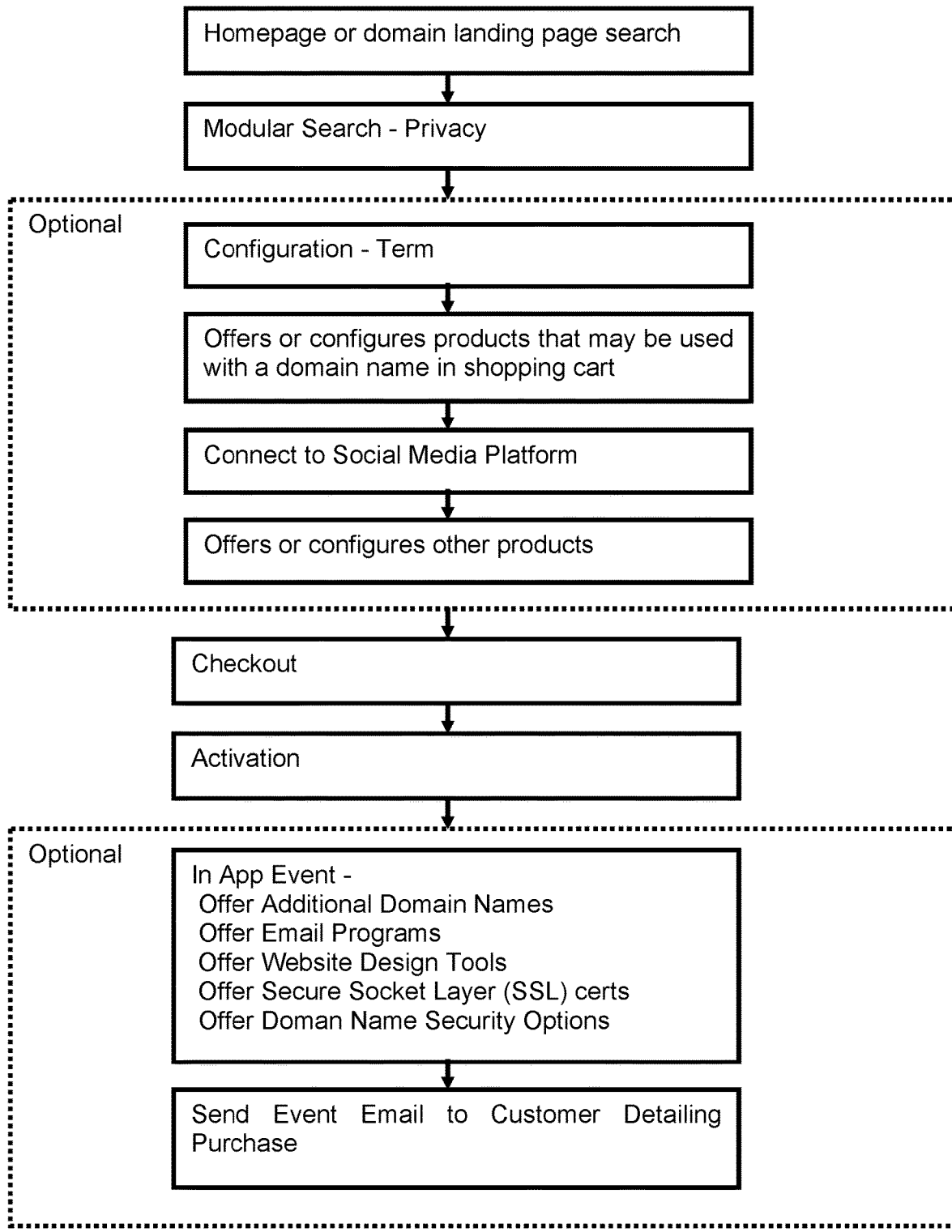
FIG. 14 illustrates a purchase path flow for domain name purchases with all phases shown.

With reference to FIG. 14, a purchase path flow for all domain name purchases with all phases is illustrated. FIG. 14 is an example of a universal purchase path for all domain name purchases by all customers. While this is the universal purchase path for all customers purchasing domain names, the universal purchase path may be customized for the customer 100 and/or the product 155 in the electronic shopping cart 150. The customization may include not displaying additional final page markups 138 for upgrades or additional products (to maximize conversion rates), or if additional final page markups 138 for upgrades or additional products are to be displayed, determining how many final page markups 138 to display and for which upgrades and/or which additional products.

Figure 15:
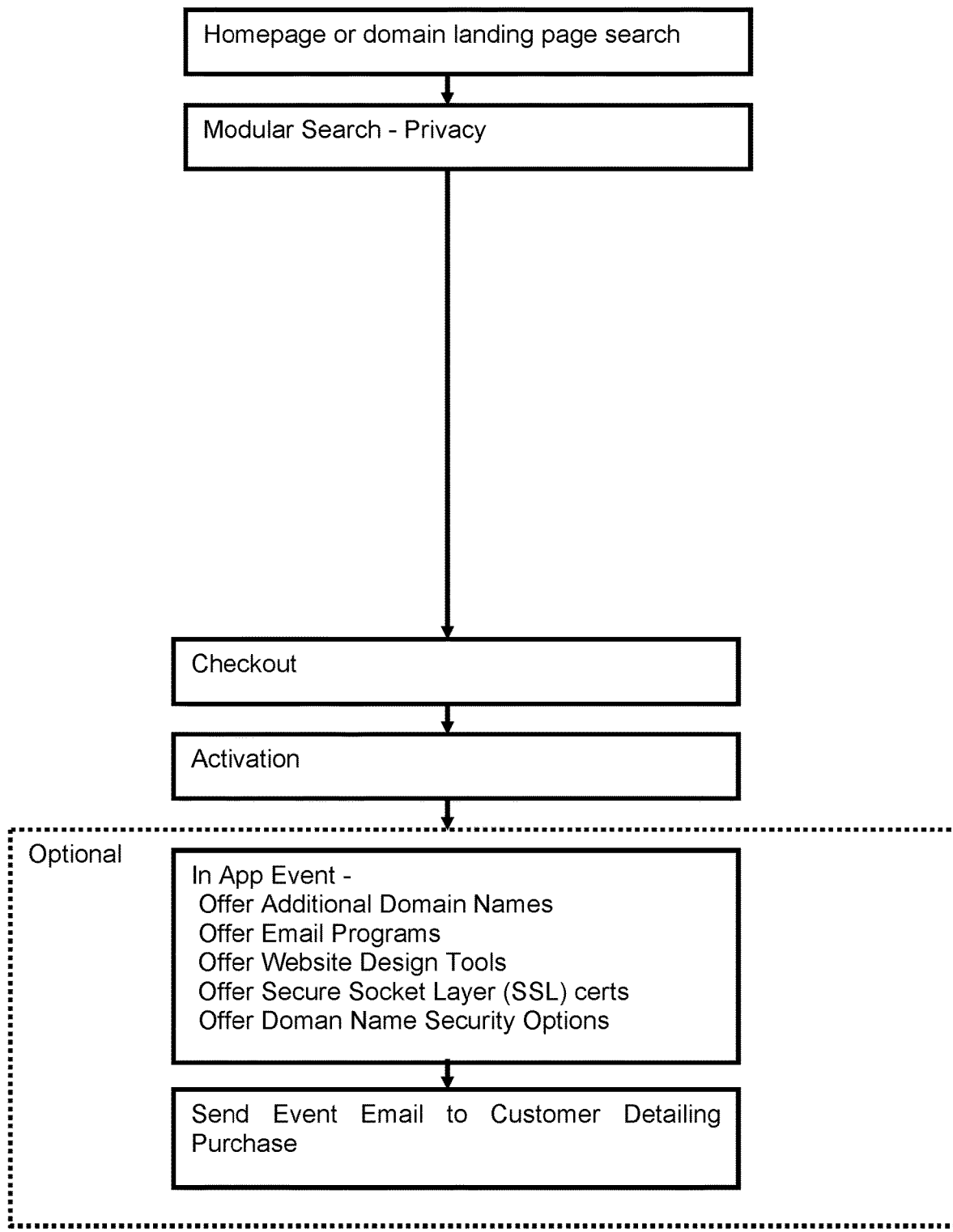
FIG. 15 illustrates a purchase path flow for domain name purchases that is optimized for conversions.
Figure 16:
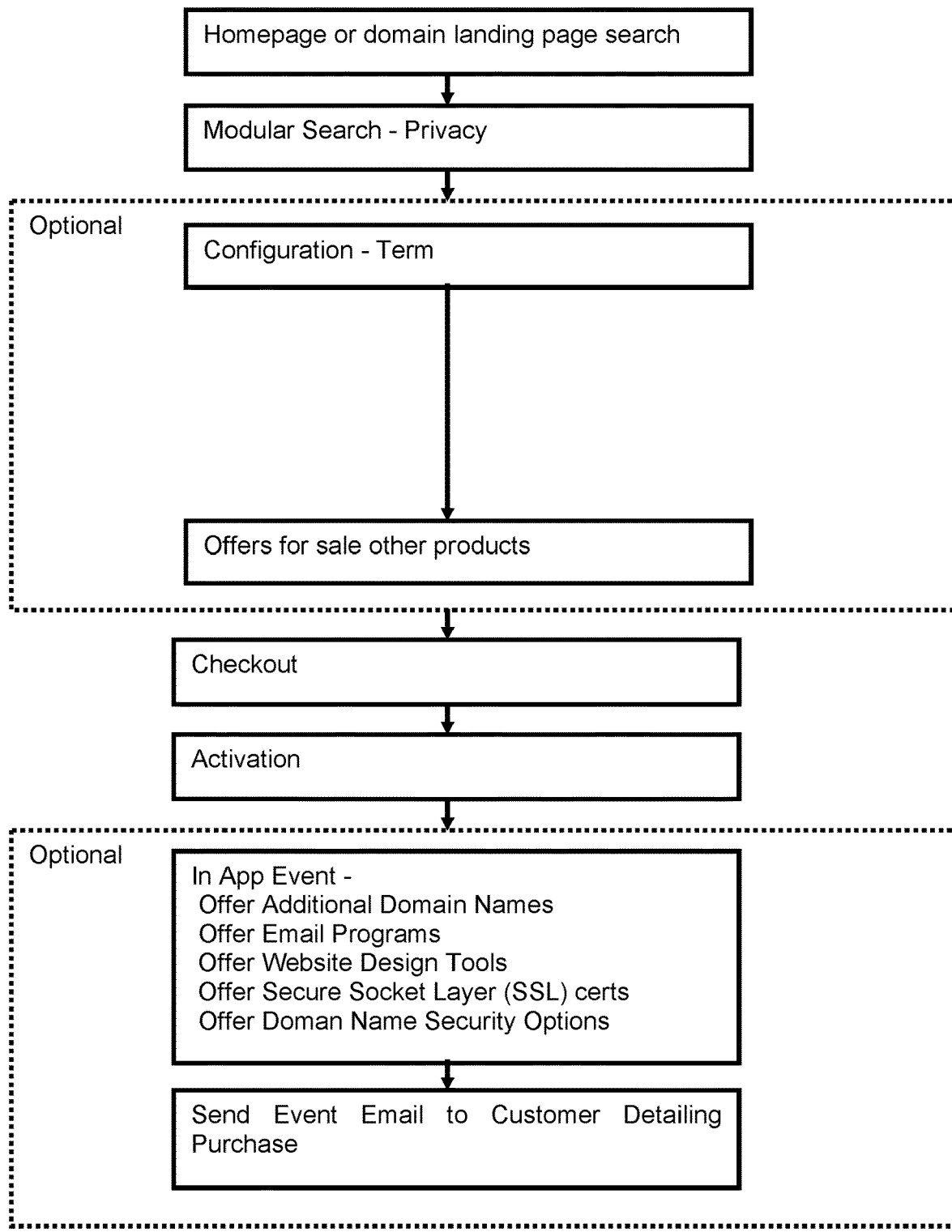
FIG. 16 illustrates a purchase path flow for domain name purchases that is optimized for LTV.

With reference to FIG. 15, a purchase path flow for domain name purchases is illustrated that is optimized for conversions. Specifically, final page markups 138 related to upgraded products or additional products are not displayed to the customer 100 in order to have the best probability that the customer 100 will complete the purchase of the original product 155. This purchase path may be used for a customer 100 that has a history of not completing the purchase for products placed in the electronic shopping cart 150 or for products that are rarely upgraded or rarely lead to additional products being sold. With reference to FIG. 16, a purchase path flow for domain name purchases is illustrated that is optimized for maximum sales, revenue, gross income, net income or LTV.

Figure 17:
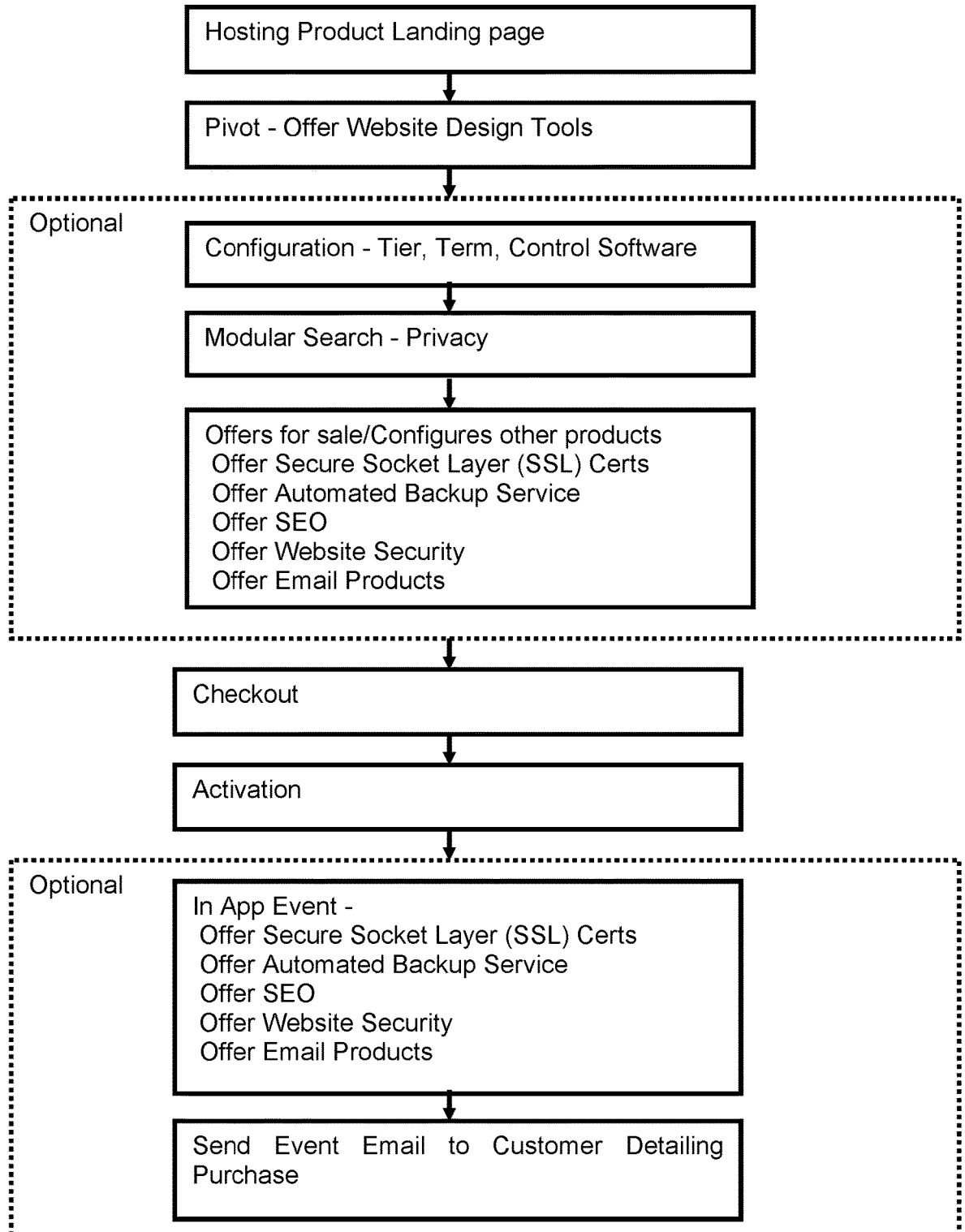
FIG. 17 illustrates a purchase path flow for hosting purchases with all phases shown.

With reference to FIG. 17, a purchase path flow for hosting services 142 purchases with all phases is illustrated. FIG. 17 is an example of a universal purchase path for all hosting services 142 purchases by all customers. While this is the universal purchase path for all customers purchasing website hosting services 142, the universal purchase path may be customized for the customer 100 and/or the product 155 in the electronic shopping cart 150. The customization may include not displaying additional final page markups 138 for upgrades or additional products (to maximize conversion rates), or if additional final page markups 138 for upgrades or additional products are to be displayed, determining how many final page markups 138 to display and for which upgrades and/or which additional products.

Figure 18:
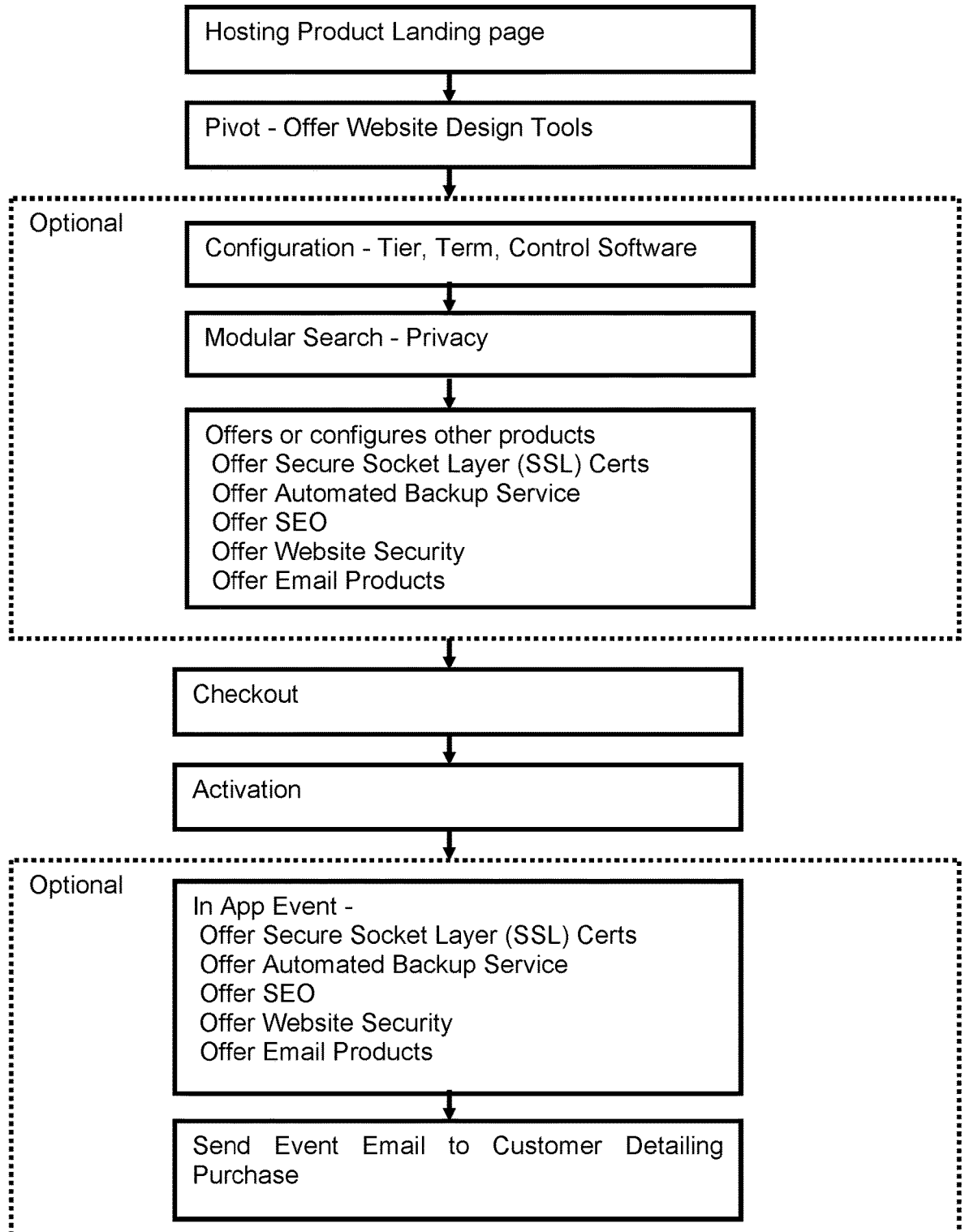
FIG. 18 illustrates a purchase path flow for hosting purchases that shows all phases and is guided.

With reference to FIG. 18, a purchase path flow for hosting service 142 purchases that shows all phases and is guided is illustrated. Specifically, final page markups 138 related to upgraded products or additional products are displayed to the customer 100 in order to have the best probability that the customer 100 will upgrade or select additional products. This purchase path may be used for a customer 100 that have a history of upgrading products or selecting additional products or for products that have a history of leading customers to upgrade or select additional products.

Figure 19:
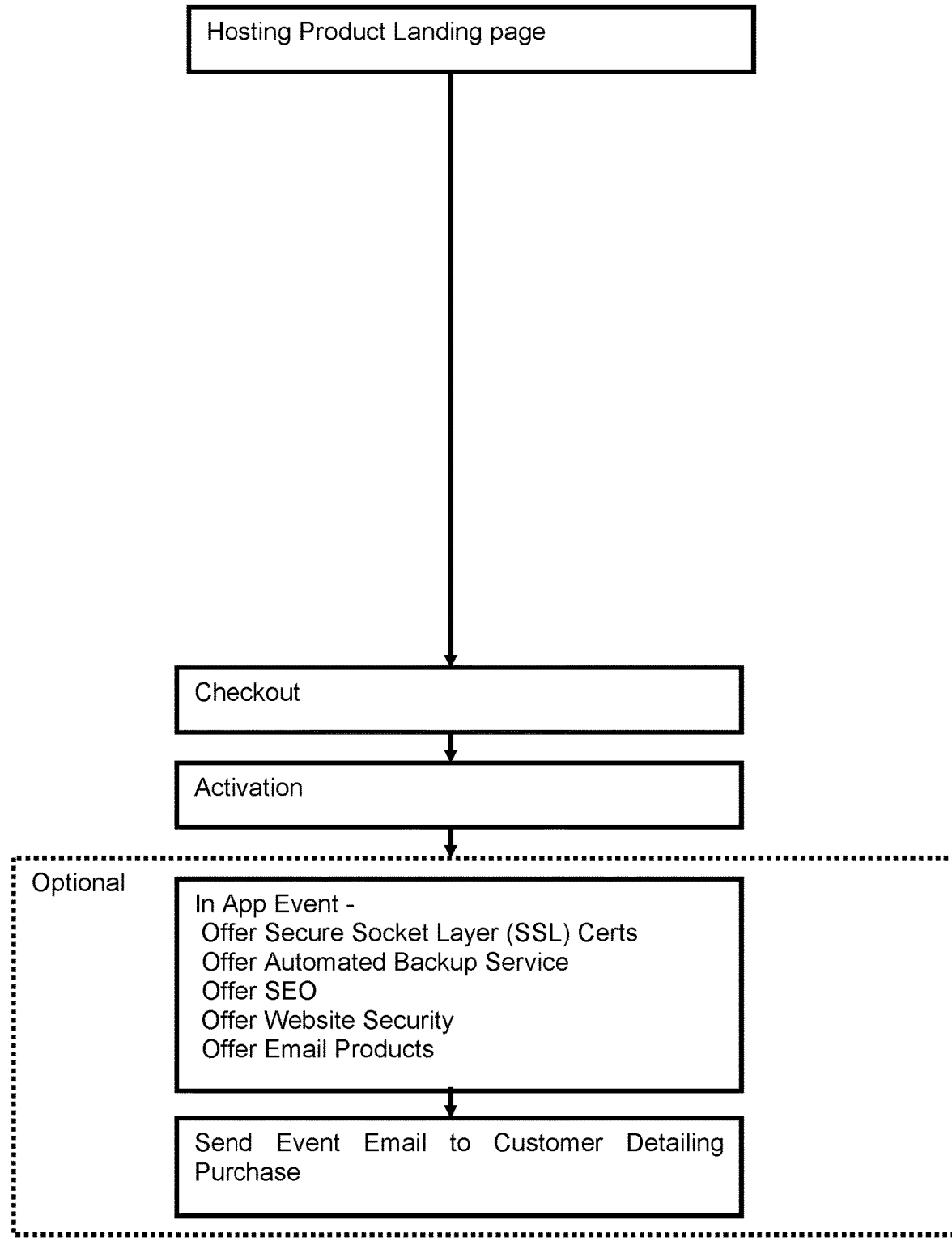
FIG. 19 illustrates a purchase path flow for hosting purchases that is optimized for conversion.

With reference to FIG. 19, a purchase path flow for hosting service 142 purchases that is optimized for conversion is illustrated. Specifically, final page markups 138 related to upgraded products or additional products are not displayed to the customer 100 in order to have the best probability that the customer 100 will complete the purchase of the original product 155. This purchase path may be used for a customer 100 that has a history of not completing the purchase for products placed in the electronic shopping cart 150 or for products that are rarely upgraded or rarely lead to additional products being purchased by customers.

Figure 13:
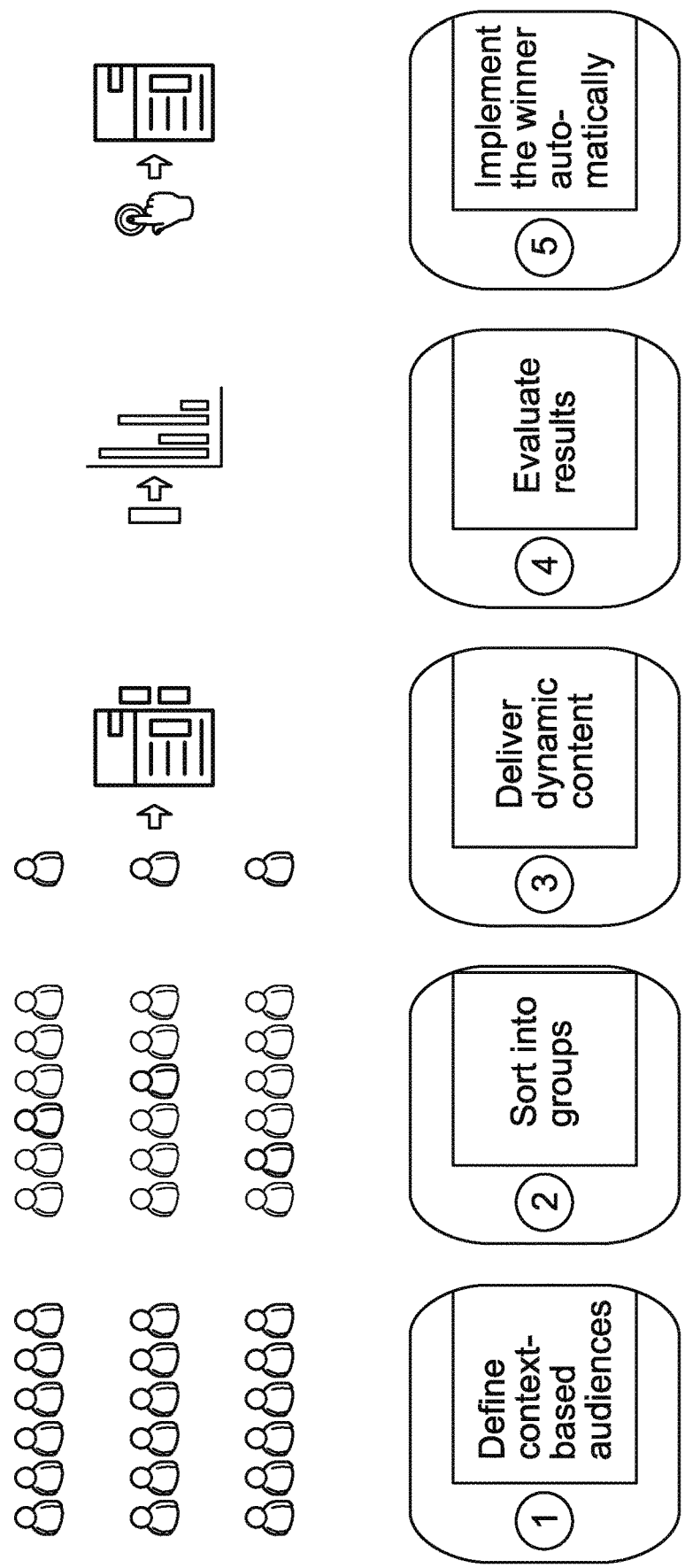
FIG. 13 illustrates a possible algorithm for that may be used in refining a universal purchase path for a domain name registrar.

With reference to FIG. 13, a possible algorithm is illustrated that may be used in refining the disclosed universal purchase path for the domain name registrar 130. The algorithm for the universal purchase path defines a plurality of context-based audiences. The algorithm may sort the audiences into a plurality of groups. Once a customer 100 is determined to be a member in a particular group, the domain name registrar 130 may deliver dynamic content to the customer 100. The domain name registrar 130 may evaluate the results (such as what percentage of customers completed their purchase and what increase in purchases was obtained by cross selling additional products) to determine which strategies maximized revenue to the domain name registrar 130. The domain name registrar 130 may then implement the winning strategy automatically, i.e., without a human directing the domain name registrar 130 to implement any particular winning strategy.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

What is claimed is:

1. A method comprising:
receiving, by a processor of an online platform, audience data identifying candidate audience for a website content;
generating, by the processor, a plurality of audience groups based at least in part on the audience data;
receiving, by the processor, user identifying data of at least one user interacting with the online platform;
determining, by the processor, that the at least one user belongs to at least one audience group of the plurality of audience groups;
generating, by the processor, personalized online content for the at least one user based on the user identifying data when the at least one user belongs to the at least one audience group of the plurality of audience groups;
tagging, by the processor, the personalized online content with a plurality of dynamic tokens to form trackable personalized online content,
wherein the trackable personalized online content comprises a plurality of modular cross sell components associated with the user;
transmitting, by the processor, instructions to a computing device associated with the at least one user to display the trackable personalized online content on a screen of the computing device;
receiving, by the processor, user activity tracking data from the computing device,
wherein the activity data identifies user activities with the trackable personalized online content based on the plurality of dynamic tokens;
training, by the processor, a scoring algorithm, based on user activity tracking data, to obtain a trained scoring content recommendation engine,
wherein the trained scoring content recommendation engine comprises an ultra-large multiple sequence alignment using Phylogeny-aware Profiles (UPP) algorithm capable of analyzing features of the scoring algorithm;
utilizing, by the processor, the UPP algorithm to dynamically rank and select trackable personalized online content for at least one other user from the at least one audience group of the plurality of audience groups, based at least in part on a plurality of markups to the trackable personalized online content;
transmitting, by the processor, instructions to another computing device associated with the at least one other user to display the dynamically ranked and selected trackable personalized online content on a screen of the another computing device.

2. The method of claim 1, wherein the scoring algorithm is based on one of gradient boosted trees, profound textual features, TF-IDF or topic modeling.

3. The method of claim 1, wherein the utilizing the UPP algorithm to identify the updated trackable personalized online content based at least in part on the plurality of markups to the trackable personalized online content further comprises:
utilizing, by the processor, a decision engine to rank the plurality of markups to the trackable personalized online content.

4. The method of claim 1, wherein the UPP algorithm comprises instructions to generate a hierarchical tree structure to analyze the plurality of markups against the user activities with the trackable personalized online content.

5. The method of claim 1, wherein the dynamically ranked and selected trackable personalized online content comprises interface components that are configured to optimize an interaction of the at least one other users with the updated trackable personalized online content.

6. A online system comprising:
a server computer, including a processor configured to:
receive audience data identifying candidate audience for a website content;
generate a plurality of audience groups based at least in part on the audience data;
receive user identifying data of at least one user interacting with the online platform;
determine that the at least one user belongs to at least one audience group of the plurality of audience groups;
generate personalized online content for the at least one user based on the user identifying data when the at least one user belongs to the at least one audience group of the plurality of audience groups;
tag the personalized online content with a plurality of dynamic tokens to form trackable personalized online content, wherein the trackable personalized online content comprises a plurality of modular cross sell components associated with the user;

transmit instructions to a computing device associated with the at least one user to display the trackable personalized online content on a screen of the computing device;

receive user activity tracking data from the computing device, wherein the activity data identifies user activities with the trackable personalized online content based on the plurality of dynamic tokens;

train a scoring algorithm, based on the user activity tracking data, to obtain a trained scoring content recommendation engine, wherein the trained scoring content recommendation engine comprises an ultra-large multiple sequence alignment using Phylogeny-aware Profiles (UPP) algorithm capable of analyzing features of the scoring algorithm;

utilize the UPP algorithm to dynamically rank and select trackable personalized online content for at least one other user from the at least one audience group of the plurality of audience groups, based at least in part on a plurality of markups to the trackable personalized online content;

transmit instructions to another computing device associated with the at least one other user to display the dynamically ranked and selected trackable personalized online content on a screen of the another computing device.

7. The system of claim 6, wherein the scoring algorithm is based on one of gradient boosted trees, profound textual features, TF-IDF or topic modeling.

8. The system of claim 6, wherein the server computer is further configured to utilize a decision engine to rank the plurality of markups to the trackable personalized online content.

9. The system of claim 6, wherein the UPP algorithm comprises instructions to generate a hierarchical tree structure to analyze the plurality of markups against the user activities with the trackable personalized online content.

10. The system of claim 6, wherein the dynamically ranked and selected trackable personalized online content comprises interface components that are configured to optimize an interaction of the at least one other users with the updated trackable personalized online content.

* * * * *